United States Patent
Hori et al.

(10) Patent No.: US 10,501,617 B2
(45) Date of Patent: Dec. 10, 2019

(54) BLOCK COPOLYMER COMPOSITION, MOLDED MATERIAL, RESIN COMPOSITION, AND MOLDED PRODUCT

(71) Applicant: Asahi Kasei Kabushiki Kaisha, Tokyo (JP)

(72) Inventors: Yukari Hori, Tokyo (JP); Satoshi Takahashi, Tokyo (JP); Naohiko Sato, Tokyo (JP); Osamu Ishihara, Tokyo (JP); Susumu Hoshi, Tokyo (JP); Kei Shimazu, Tokyo (JP)

(73) Assignee: Asahi Kasei Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/548,895

(22) PCT Filed: Feb. 5, 2016

(86) PCT No.: PCT/JP2016/053568
§ 371 (c)(1),
(2) Date: Aug. 4, 2017

(87) PCT Pub. No.: WO2016/129532
PCT Pub. Date: Aug. 18, 2016

(65) Prior Publication Data
US 2018/0022913 A1    Jan. 25, 2018

(30) Foreign Application Priority Data

Feb. 9, 2015 (JP) .................................. 2015-023199
Feb. 9, 2015 (JP) .................................. 2015-023417

(51) Int. Cl.
| | |
|---|---|
| *C08L 53/02* | (2006.01) |
| *C08L 25/06* | (2006.01) |
| *C08L 25/10* | (2006.01) |
| *C08L 9/06* | (2006.01) |
| *C08L 25/08* | (2006.01) |
| *C08F 297/04* | (2006.01) |
| *C08L 51/04* | (2006.01) |
| *C08L 55/02* | (2006.01) |

(52) U.S. Cl.
CPC .......... *C08L 53/02* (2013.01); *C08F 297/044* (2013.01); *C08L 9/06* (2013.01); *C08L 25/06* (2013.01); *C08L 25/08* (2013.01); *C08L 25/10* (2013.01); *C08L 51/04* (2013.01); *C08L 55/02* (2013.01); *C08L 2201/10* (2013.01); *C08L 2205/02* (2013.01); *C08L 2205/03* (2013.01); *C08L 2205/035* (2013.01); *Y02P 20/582* (2015.11)

(58) Field of Classification Search
None
See application file for complete search history.

(56) References Cited

U.S. PATENT DOCUMENTS

| | | | |
|---|---|---|---|
| 3,907,931 A | 9/1975 | Durst | |
| 4,104,326 A | 8/1978 | Fodor | |
| 4,361,675 A * | 11/1982 | Tan | ........................ C08L 51/04 524/504 |
| 4,408,006 A * | 10/1983 | Milkovich | ............. A43B 13/04 524/505 |
| 2003/0191241 A1* | 10/2003 | Fujiwara | ................. C08L 23/00 525/88 |
| 2011/0008561 A1* | 1/2011 | Kawauchi | .................. C08J 5/18 428/36.92 |

FOREIGN PATENT DOCUMENTS

| | | |
|---|---|---|
| JP | S56-070044 A | 6/1981 |
| JP | S57-021449 A | 2/1982 |
| JP | S61-254650 A | 11/1986 |
| JP | S63-072750 A | 4/1988 |
| JP | H04-039351 A | 2/1992 |
| JP | 2002-348341 A | 12/2002 |
| JP | 2003-128861 A | 5/2003 |
| JP | 2005-206694 A | 8/2005 |
| WO | 2012/063812 A1 | 5/2012 |

OTHER PUBLICATIONS

International Search Report issued in corresponding International Patent Application No. PCT/JP2016/053568 dated Mar. 1, 2016.
Supplementary European Search Report issued in counterpart European Patent Application No. 16749176.0 dated Feb. 1, 2018.
International Preliminary Report on Patentability issued in corresponding International Patent Application No. PCT/JP2016/053568 dated Aug. 15, 2017.

* cited by examiner

*Primary Examiner* — Christopher M Rodd
(74) *Attorney, Agent, or Firm* — Morgan, Lewis & Bockius LLP

(57) ABSTRACT

A block copolymer composition comprising:
  a polymer (a) comprising more than 95% by mass and 100% by mass or less of a vinyl aromatic monomer unit and 0% by mass or more and less than 5% by mass of a conjugated diene monomer unit; and
  a block copolymer (b) comprising 15% by mass or more and 50% by mass or less of a vinyl aromatic monomer unit and 50% by mass or more and 85% by mass or less of a conjugated diene monomer unit, wherein
  a mass ratio of the polymer (a) to the block copolymer (b) satisfies:

$(a)/(b)=70/30$ to $30/70$.

15 Claims, 1 Drawing Sheet

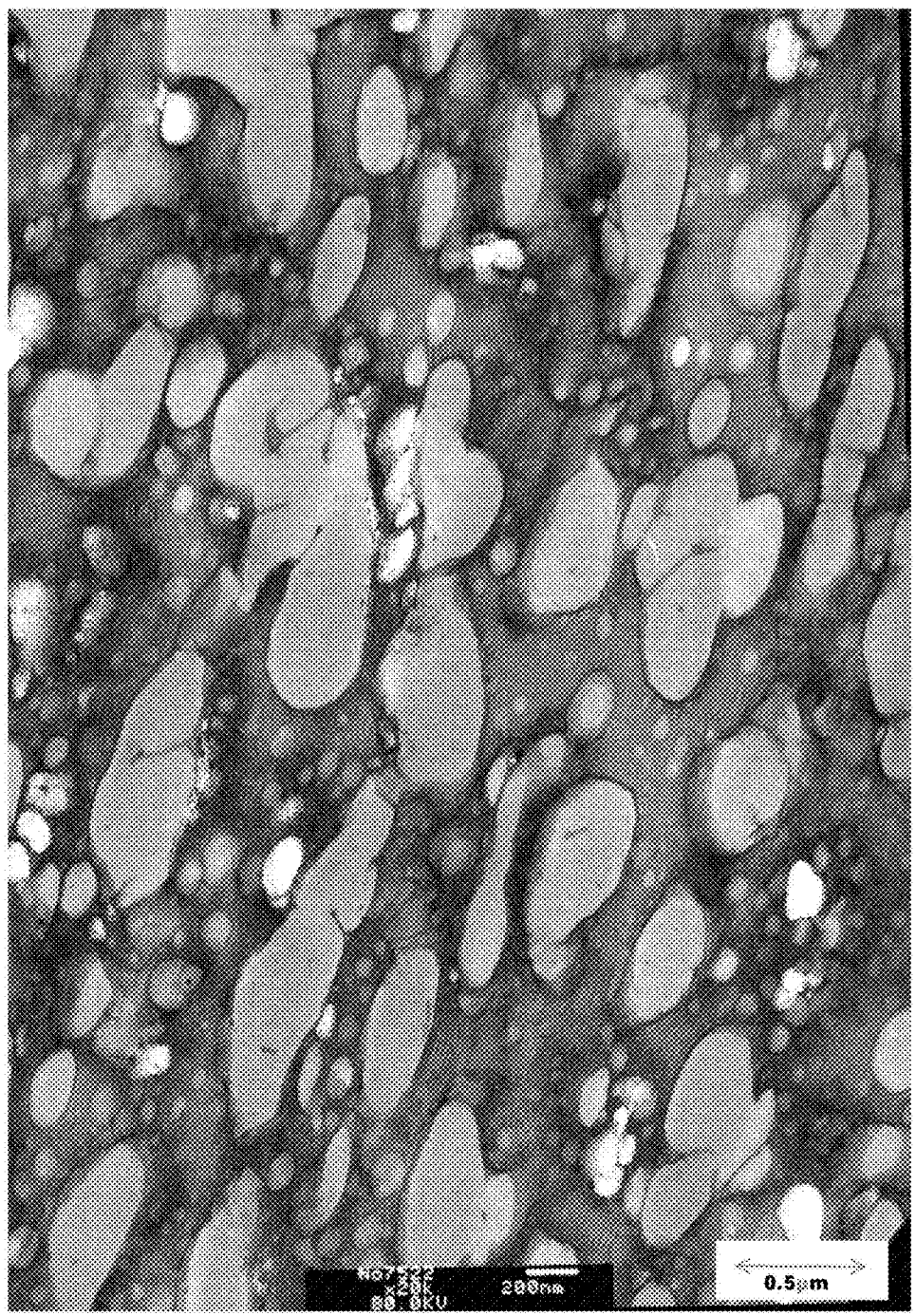

BLOCK COPOLYMER COMPOSITION, MOLDED MATERIAL, RESIN COMPOSITION, AND MOLDED PRODUCT

TECHNICAL FIELD

The present invention relates to a block copolymer composition, a molded material, a resin composition, and a molded product.

BACKGROUND OF INVENTION

Styrene-butadiene copolymer resins (hereinafter, also referred to as "SBC resin") are known to have high flexibility due to a butadiene rubber component contained therein and in addition have excellent transparency and processability, and by virtue of the feature, they have been conventionally used for a wide variety of applications such as packaging materials for food, packaging materials for electronic parts, blister packages, and toys.

Although the SBC resin may be used singly in these applications, it is more common that an SBC resin is used in a blend with a styrene homopolymer resin (GPPS), a polystyrene resin such as an high impact polystyrene (HIPS), or a styrene-alkyl (meth)acrylate copolymer resin.

The reason is, for example, that such blending facilitates control of balance between impact resistance and stiffness and balance between mechanical characteristics and economic efficiency in the material design. Specifically, use of two starting materials of an SBC resin and a polystyrene resin with the blending ratio between them adjusted provides the intended properties of a product, and moreover a wide variety of materials can be produced in accordance with the intended properties of a product.

Many techniques have been previously disclosed in which an SBC resin having a high copolymerization ratio of styrene and a styrene-butadiene copolymer elastomer (hereinafter, also referred to as "SBS elastomer") having a low copolymerization ratio of styrene and being excellent in flexibility are combined and blended with a polystyrene resin or styrene-alkyl (meth)acrylate copolymer resin to obtain a resin composition being transparent and excellent in flexibility and impact resistance.

For example, Patent Literature 1 discloses a polystyrene resin composition comprising an SBC resin, an SBS elastomer, and a polystyrene resin.

CITATION LIST

Patent Literature

Patent Literature 1: Japanese Patent Laid-Open No. 56-70044

SUMMARY OF INVENTION

Technical Problem

However, the polystyrene resin composition described in Patent Literature 1, to which an SBC resin (styrene content: 62% by mass) and an SBS elastomer (styrene content: 39% by mass) as modifiers have been added in the course of obtaining a polystyrene resin composition, requires blending a quite a large amount of an SBS elastomer to achieve sufficient impact resistance because the SBS resin and the SBS elastomer are not in a state of a composition, and thus has a problem of lowered stiffness. For this reason, the balance between impact resistance and stiffness is insufficient, and disadvantageously, a molded product having resilience sufficient for practical use cannot be obtained.

In addition, the polystyrene resin composition described in Patent Literature 1 comprises the SBS elastomer dispersed in an inefficient manner, and as a result, when being molded into a molded product in a sheet, generates a large difference in mechanical characteristics between the longitudinal direction and the width direction (called anisotropy) in the sheet, and the difference disadvantageously lowers the isotopy of the sheet.

In view of the above-described problems inherent in the conventional techniques, it is an object of the present invention to significantly improve the dispersibility of an SBS elastomer with a low styrene content to provide a block copolymer composition allowing significant improvement of the balance between impact resistance and stiffness and isotropy, a resin composition comprising the block copolymer composition, and a molded product.

Solution to Problem

As a result of diligent studies to solve the above problems, the present inventors have found that the above problems can be solved by using a block copolymer composition comprising a given polymer (a) and a given block copolymer (b) as an impact resistance modifier for a resin such as polystyrene, and has completed the present invention.

Specifically, the present invention is as follows:

[1]

A block copolymer composition comprising:

a polymer (a) comprising more than 95% by mass and 100% by mass or less of a vinyl aromatic monomer unit and 0% by mass or more and less than 5% by mass of a conjugated diene monomer unit; and a block copolymer (b) comprising 15% by mass or more and 50% by mass or less of a vinyl aromatic monomer unit and 50% by mass or more and 85% by mass or less of a conjugated diene monomer unit, wherein a mass ratio of the polymer (a) to the block copolymer (b) satisfies:

$$(a)/(b)=70/30 \text{ to } 30/70.$$

[2]

The block copolymer composition according to the above [1], wherein the polymer (a) comprises:

more than 95% by mass and less than 100% by mass of a vinyl aromatic monomer unit and more than 0% by mass and less than 5% by mass of a conjugated diene monomer unit.

[3]

The block copolymer composition according to the above [1] or [2], wherein a total content of a dimer and trimer each comprising a vinyl aromatic monomer is less than 1000 ppm.

[4]

The block copolymer composition according to any one of the above [1] to [3], wherein a haze value for 2 mm thickness defined in ISO 14782 is 65% or more and 100% or less.

[5]

The block copolymer composition according to any one of the above [1] to [4], wherein the block copolymer composition has at least one peak molecular weight in a range of 30000 or more and 180000 or less in a molecular weight distribution curve obtained through a GPC method.

[6]
The block copolymer composition according to any one of the above [1] to [5], wherein the block copolymer composition has at least one tan δ peak of dynamic viscoelasticity at a temperature in a range of −70° C. to −40° C.

[7]
A molded material comprising the block copolymer composition according to any one of the above [1] to [6].

[8]
A resin composition comprising:
80% by mass or more and 99% by mass or less of a rubber-modified vinyl aromatic polymer (c); and
1% by mass or more and 20% by mass or less of the block copolymer composition according to any one of the above [1] to [6] or the molded material according to the above [7].

[9]
A resin composition comprising:
more than 0% by mass and 80% by mass or less of a vinyl aromatic-based polymer (d);
10% by mass or more and 45% by mass or less of a rubber-modified vinyl aromatic polymer (c); and
10% by mass or more and 55% by mass or less of the block copolymer composition according to any one of the above [1] to [6] or the molded material according to the above [7].

[10]
A molded product comprising the resin composition according to the above [8] or [9].

Advantageous Effects of Invention

The present invention can provide a block copolymer composition capable of providing a resin composition and molded product having satisfactory balance between excellent impact resistance and high stiffness and further having excellent isotropy.

BRIEF DESCRIPTION OF DRAWING

FIG. 1 shows a transmission electron micrograph (hereinafter, referred to as "TEM image") of a block copolymer composition.

DESCRIPTION OF EMBODIMENTS

Hereinafter, embodiments of the present invention (hereinafter, referred to as "the present embodiments") will be described in detail.

However, the present invention is not limited to the present embodiments below, and can be implemented with various modifications within the scope of the gist.

[Block Copolymer Composition]

A block copolymer composition according to the present embodiments comprises:
a polymer (a) comprising more than 95% by mass and 100% by mass or less of a vinyl aromatic monomer unit and 0% by mass or more and less than 5% by mass of a conjugated diene monomer unit; and
a block copolymer (b) comprising 15% by mass or more and 50% by mass or less of a vinyl aromatic monomer unit and 50% by mass or more and 85% by mass or less of a conjugated diene monomer unit, and
the mass ratio of the polymer (a) to the block copolymer (b) satisfies:

(a)/(b)=70/30 to 30/70.

When the block copolymer composition according to the present embodiments and general-purpose polystyrene or the like are used in combination to produce a resin composition, the configuration according to the present embodiments in which the polymer (a) and the block copolymer (b) are in a state of a composition allows the block copolymer (b), as an SBS elastomer with a relatively low styrene content, to be sufficiently dispersed in a resin such as general-purpose polystyrene in the course of charging into an extruder and melting to obtain a sheet of a resin composition, and thus the SBS elastomer can be finely dispersed in an efficient manner with a limited length (L/D) of an extruder.

Here, examples of preferred modes of "being in a state of a composition" include a state in which the polymer (a) and the block copolymer (b) are compatible in the order of micrometers.

The block copolymer (b), as an SBS elastomer, in an efficient dispersed state allows efficient development of impact resistance, and provides an impact resistance sufficient for practical use without lowering of stiffness, without need of blending a larger amount of an SBS elastomer to achieve a desired impact resistance.

In addition, a resin composition with the block copolymer composition according to the present embodiments comprises an SBS elastomer well dispersed therein, which reduces the difference in mechanical characteristics between the longitudinal direction and the width direction (called anisotropy) in a sheet and imparts an improved isotopy to a sheet.

Here, it is preferred for the block copolymer composition according to the present embodiments that the polymer (a) and the block copolymer (b) be compatible in the order of micrometers, as shown in FIG. 1.

In FIG. 1, a light-colored part forming a dispersed phase having a size of about 0.5 μm or less corresponds to the polymer (a), and a dark-colored part forming a continuous phase corresponds to the block copolymer (b).

Use of a transmission electron microscope in accordance with a method described later in Examples can confirm that the polymer (a) and the block copolymer (b) are compatible.

When a resin composition is produced through blending a molded material comprising the block copolymer composition according to the present embodiments with polystyrene or the like, an enhanced blending efficiency is achieved by virtue of the satisfactory dispersibility of the SBS elastomer component, and thus the amount of the SBS elastomer component to be blended for development of a desired impact strength can be reduced. As a result, lowering of stiffness can be minimized, and a molded product having excellent balance between impact strength and stiffness is provided. Especially, when a polystyrene sheet is formed through molding with blending of the block copolymer composition according to the present embodiments, a molded product in a sheet excellent in isotropy can be obtained, which is significant improvement over conventional SBS elastomer-blended sheets with a disadvantage of large anisotropy between the longitudinal direction and the width direction associated with the large deviation of the value of tensile modulus in the longitudinal direction. A container or the like formed from thus-produced sheet, which is excellent in isotropy with the anisotropy overcome has higher resistance to a deformation stress from the outside and is robust and less destructible even in a small thickness.

In the present specification, nomenclature for each monomer unit included in a polymer is in accordance with that for a monomer from which the monomer unit is derived.

For example, a "vinyl aromatic monomer unit" refers to a constitutional unit of a polymer resulting from polymerization of a vinyl aromatic monomer as the monomer, and the structure is a molecular structure in which two carbon atoms in a substituted ethylene group derived from a substituted vinyl group serve as the main chain of the polymer.

A "conjugated diene monomer unit" refers to a constitutional unit of a polymer resulting from polymerization of a conjugated diene monomer as the monomer, and the structure is a molecular structure in which two carbon atoms in an olefin derived from a conjugated diene monomer serve as the main chain of the polymer.

(Dimer and Trimer Comprising Vinyl Aromatic Monomer)

Generally, a block copolymer is produced through anionic polymerization with an organic alkali metal described later.

A homopolymer comprising a vinyl aromatic monomer is generally produced through radical polymerization, and can be produced also through anionic polymerization.

The block copolymer composition according to the present embodiments preferably comprises a polymer (a) and a block copolymer (b) each produced through anionic polymerization, and as a result of this configuration, the block copolymer composition according to the present embodiments has a lower content of the dimer and trimer comprising a vinyl aromatic monomer than a homopolymer comprising a vinyl aromatic monomer, such as polystyrene, produced through radical polymerization.

A dimer and trimer comprising a vinyl aromatic monomer refer to a compound in which two molecules of a vinyl aromatic monomer are bonded together and a compound in which three molecules of a vinyl aromatic monomer are bonded together, respectively.

The chemical structure of the dimer and trimer is not limited at all. In the case of the dimer, for example, cyclic dimers with a cyclic structure formed via a vinyl bond and linear dimers with a linear structure are both encompassed in the concept of the dimer. The same is applied to the trimer.

In the case of radical polymerization, the dimer and trimer are often generated through side reaction in polymerization, and typically the dimer and trimer are contained at a total content of about 3000 to 10000 ppm in most cases.

In the case of anionic polymerization with an organic alkali metal, on the other hand, the dimer and trimer are generated very little in polymerization, and cleavage of the molecule in accordance with the thermal history or the like in a subsequent step of conversion into a molded material may generate a trace amount of the dimer or trimer. Even in such a case, typically the total content of the dimer and trimer is less than 1000 ppm in most cases.

In the case of a polymer (a) comprising a vinyl aromatic monomer produced through radial polymerization, the dimer and trimer generated through cleavage of the molecule in accordance with the thermal history in a subsequent step are present concomitantly with the dimer and trimer generated through side reaction in polymerization.

The molecular weights of the dimer and trimer generated through cleavage of the molecule are not necessarily just twice and three times as large as that of a vinyl aromatic monomer, respectively, and in some cases the molecular weight deviates from multiples of the molecular weight of the monomer, depending on the site of cleavage. In this case, the number of aromatic rings contained in the molecule can be used to determine whether the molecule is a dimer, a trimer, or another molecule.

In the block copolymer composition according to the present embodiments and a molded material comprising the block copolymer composition, the total content of the dimer and trimer comprising a vinyl aromatic monomer is preferably less than 1000 ppm, more preferably 500 ppm or less, and further preferably 250 ppm or less.

The configuration in which the total content of the dimer and trimer comprising a vinyl aromatic monomer is less than 1000 ppm provides a block copolymer composition and molded material excellent in mechanical characteristics and quality.

To set the total content of the dimer and trimer comprising a vinyl aromatic monomer to less than 1000 ppm, the polymer (a) is preferably a polymer produced through anionic polymerization, and more preferably the block copolymer has a vinyl aromatic monomer unit content of more than 95% by mass and less than 100% by mass and a conjugated diene monomer unit content of more than 0% by mass and less than 5% by mass.

The content of the dimer and trimer comprising a vinyl aromatic monomer can be measured by using a method described later in Examples.

(Haze Value of Block Copolymer Composition)

The haze value is one of indicators used for evaluation of the transparency of a resin material, and can be measured by using a method defined in ISO 14782.

Although ISO 14782 recites "This test method is applicable to the material having a haze values of 40% or less measured by this method.", haze values defined in the present embodiments are measured by using the method defined in ISO 14782 even when the haze value to be measured is more than 40%.

The haze value of the block copolymer composition according to the present embodiments and a molded material comprising the block copolymer composition in a mirror-surface plate having a thickness of 2 mm is preferably 65% or more or 100% or less, more preferably 75% or more and 100% or less, and further preferably 85% or more and 100% or less.

A configuration in which the vinyl aromatic monomer content of the polymer (a) and that of the block copolymer (b) are largely different and the polymer (a) and the block copolymer (b) form a phase-separated structure in the order of micrometers makes the block copolymer composition clouded, and the haze value falls within the above preferred haze value range.

For example, a block copolymer composition comprising 50% by mass of a polymer (a) (melt flow rate: 5.0) comprising 99% by mass of styrene and 1% by mass of butadiene and 50% by mass of a block copolymer (b) (melt flow rate: 16) comprising 40% by mass of styrene and 60% by mass of butadiene has a haze value of 92%, and the block copolymer composition has been confirmed to have a structure in which the block copolymer (b) is forming a continuous layer and the polymer (a), as a domain, is homogeneously dispersed at about 1 μm or less.

For measurement of the melt flow rate, a method for measuring the melt flow rate of a block copolymer composition described later can be applied.

(Peak Molecular Weight, Molecular Weight, and Molecular Weight Distribution)

Although the peak molecular weight, weight average molecular weight (Mw), and number average molecular weight (Mn) of the polymer (a) are not limited at all, they are each preferably 10000 to 1000000, more preferably 30000 to 400000, and further preferably 40000 to 300000.

Although the peak molecular weight, weight average molecular weight (Mw), and number average molecular weight (Mn) of the block copolymer (b) are not limited at all, they are each preferably 10000 to 1000000, more preferably 30000 to 400000, and further preferably 40000 to 300000.

The block copolymer composition according to the present embodiments comprising the polymer (a) and the block copolymer (b) preferably has at least one peak molecular weight in a range of 30000 or more and 180000 or less, preferably has at least one peak molecular weight in a range of 40000 or more and 150000 or less, and preferably has at least one peak molecular weight in a range of 45000 or more and 130000 or less, in the molecular weight distribution curve obtained through a GPC method.

The block copolymer composition according to the present embodiments may have two or more peak molecular weights in the above range in the molecular weight distribution curve obtained through a GPC method.

In terms of the shape of the molecular weight peak in the molecular weight distribution curve, the molecular weight distribution may be a sharp distribution with a narrow peak, or a broad distribution with a broad peak. The block copolymer composition according to the present embodiments may have an additional peak molecular weight in a molecular weight region of less than 30000 or more than 180000.

The block copolymer composition according to the present embodiments having a peak molecular weight in the above range tends to have satisfactory dispersibility and an improved balance between impact resistance and stiffness when being used as a modifier for a polystyrene resin.

The peak molecular weight, weight average molecular weight (Mw), and number average molecular weight (Mn) of the polymer (a) may be the same as or different from those of the block copolymer (b).

Practically, it is not necessarily easy to separate the polymer (a) and the block copolymer (b) from the composition to calculate the peak molecular weight, weight average molecular weight (Mw), and number average molecular weight (Mn) of each of the polymer (a) and the block copolymer (b), and they can be defined on the basis of the molecular weight of the block copolymer composition. Specifically, they can be detected as two or more peaks at different molecular weights or as a gentle, broad peak.

The molecular weight distribution (Mw/Mn) of the block copolymer composition according to the present embodiments is not limited.

By using a coupling agent or the like to allow some of the polymerization-active ends of the polymer to associate with each other, a polymer (a) having a combination of different molecular weights and block copolymer (b) having a combination of different molecular weights can be obtained.

In addition, polymerization of a part of the polymer can be suspended in the middle of the polymerization by adding an alcohol such as ethanol in an amount by mole less than that of a polymerization initiator used, and as a result a combination of a polymer (a) and block copolymer (b) having different molecular weights can be obtained. Thus, the degree of freedom for designing the molecular weight is large.

The peak molecular weight, weight average molecular weight (Mw), and number average molecular weight (Mn) of the block copolymer composition can be measured with GPC in accordance with a method described in Examples.

(Melt Flow Rate of Block Copolymer Composition)

The melt flow rate (ISO 1133, temperature: 200° C., load: 5 kgf) of the block copolymer composition is preferably 0.1 to 50 g/10 min, more preferably 3 to 30 g/10 min, and further preferably 6 to 25 g/10 min.

The melt flow rate of the block copolymer composition in the above range tends to improve the appearance when molded, impact resistance, and crack resistance of a molded product obtained from a resin composition comprising a combination of the block copolymer composition according to the present embodiments and a rubber-modified vinyl aromatic polymer (c) or a vinyl aromatic-based polymer (d), each described later, in combination.

The melt flow rate of the block copolymer composition can be measured in accordance with a method described in Examples.

Although the melt flow rate of each component of the polymer (a) and the block copolymer (b) is not limited at all, it is preferred that the melt flow rate of the block copolymer (b) be higher than that of the polymer (a), from the viewpoint of development of desired properties.

(Temperature at Tan δ Peak of Dynamic Viscoelasticity of Block Copolymer Composition)

The block copolymer composition according to the present embodiments preferably has at least one loss tangent (tan δ) peak as measured in dynamic viscoelasticity measurement at a temperature in the range of −70° C. to −40° C.

The block copolymer composition having a tan δ peak at a temperature in the above range provides a resin composition which exhibits excellent impact resistance, has an excellent balance between stiffness and impact resistance, and is also excellent in heat-aging resistance.

A tan δ peak present in the temperature range is presumably derived from the transition temperature resulting from a block comprising both a conjugated diene monomer unit and a vinyl aromatic monomer unit in the block copolymer (b).

In the case that a block comprising both a conjugated diene monomer unit and a vinyl aromatic monomer unit is present in the polymer (a), a clear tan δ peak is not observed at a temperature in the range of −70° C. to −40° C. because the content of the conjugated diene monomer unit is less than 5% by mass.

Because the temperature at a tan δ peak of a copolymer block primarily comprising a butadiene monomer unit is lower than −70° C., incorporation of at least one random copolymer block (B/S) comprising both a conjugated diene monomer and a vinyl aromatic monomer unit allows the temperature at a tan δ peak to fall within the temperature range.

The temperature at a tan δ peak is hardly influenced by the polymer (a) for both cases of the block copolymer (b) in a single configuration and the block copolymer composition, and thus is a stable, constant value. Accordingly, the temperature at a tan δ peak can be considered to reflect the block structure comprising the conjugated diene unit of the block copolymer (b).

The dynamic viscoelasticity of the block copolymer composition according to the present embodiments can be measured in accordance with a method described later in Examples.

The tan δ peak is presumably derived from the random copolymer block (B/S) in the block copolymer (b).

In the case that a plurality of random copolymer blocks (B/S) having different ratios between a vinyl aromatic monomer unit and a conjugated diene monomer unit is comprised, for example, a plurality of peaks may be present, or one broad, gentle peak may be observed.

The temperature at a tan δ peak of dynamic viscoelasticity shifts to a higher temperature as the copolymerization ratio of a vinyl aromatic monomer unit of the random copolymer block (B/S) increases, and shifts to a lower temperature as the copolymerization ratio of a vinyl aromatic monomer unit of the random copolymer block (B/S) decreases.

The block copolymer (b) may have a tan δ peak at a temperature out of the above range. In fact, the block copolymer (b) has, in many cases, a peak derived from a copolymer block primarily comprising a vinyl aromatic copolymer.

Since a random copolymer block of a conjugated diene monomer unit and a vinyl aromatic monomer unit more improves the resistance to thermal degradation than a block of a conjugated diene monomer unit in a single configuration, the block copolymer composition according to the present embodiments having at least one loss tangent (tan δ) peak as measured in dynamic viscoelasticity measurement at a temperature in the range of −70° C. to −40° C. has an enhanced resistance to thermal degradation.

(Mass Ratio of Polymer (a) to Block Copolymer (b))

The mass ratio ((a)/(b)) of the polymer (a) to the block copolymer (b) is 70/30 to 30/70, preferably 67/33 to 40/60, more preferably 60/40 to 40/60, and further preferably 55/45 to 45/55.

The mass ratio in the above range is preferred because gelling of the block copolymer composition in processing can be prevented while impact resistance for a modifier for a polystyrene resin well-balanced with stiffness is imparted.

(Polymer (a))

The polymer (a) comprises more than 95% by mass and 100% by mass or less of a vinyl aromatic monomer unit and 0% by mass or more and less than 5% by mass of a conjugated diene monomer unit on the basis of the total amount of the polymer (a).

The polymer (a) may comprise an additional polymerizable compound unit other than the vinyl aromatic monomer unit and the conjugated diene monomer unit, as necessary.

The vinyl aromatic monomer may be any compound having an aromatic ring and a vinyl group in the molecule, and examples thereof include, but not limited to, styrene, o-methylstyrene, m-methylstyrene, p-methylstyrene, o-ethylstyrene, p-ethylstyrene, p-tert-butylstyrene, 2,4-dimethylstyrene, 1,3-dimethylstyrene, α-methylstyrene, α-methyl-p-methylstyrene, vinylnaphthalene, vinylanthracene, and 1,1-diphenylethylene.

Particularly, styrene is common and preferred.

Only one of them may be used singly, or two or more thereof may be used in combination.

The conjugated diene monomer may be any diolefin having a pair of conjugated double bonds, and examples thereof include, but not limited to, 1,3-butadiene, 2-methyl-1,3-butadiene (isoprene), 2,3-dimethyl-1,3-butadiene, 1,3-pentadiene, and 1,3-hexadiene.

In particular, 1,3-butadiene and isoprene are common and preferred.

Only one of them may be used singly, or two or more thereof may be used in combination.

The content of the vinyl aromatic monomer unit in the polymer (a) is more than 95% by mass and 100% by mass or less, preferably more than 95% by mass and less than 100% by mass, more preferably more than 97% by mass and less than 100% by mass, and further preferably 98.5% by mass or more and less than 100% by mass based on the total amount of the polymer (a).

The content of the conjugated diene monomer unit in the polymer (a) is in the range of 0% by mass or more and less than 5% by mass, preferably in the range of more than 0% by mass and less than 5% by mass, more preferably in the range of more than 0% by mass and 3% by mass or less, and further preferably in the range of more than 0% by mass and 1.5% by mass or less based on the total amount of the polymer (a).

The content of each of the vinyl aromatic monomer unit and the conjugated diene monomer unit can be calculated in accordance with a method described later in Examples.

Use of the polymer (a) in which the content of the vinyl aromatic monomer unit and the content of the conjugated diene monomer unit individually fall within the above ranges provides a resin composition having excellent balance between stiffness and impact resistance.

Examples of the polymer (a) include both a homopolymer of a vinyl aromatic monomer comprising 100% by mass of a vinyl aromatic monomer unit, and a copolymer comprising more than 0% by mass and less than 5% by mass of a conjugated diene monomer unit.

In the case that the polymer (a) is a polymer comprising only a vinyl aromatic monomer, the polymer (a) is a polymer commonly called "general-purpose polystyrene (GPPS)", one of general-purpose resins industrially mass-produced.

In the case that the polymer (a) is a copolymer with a conjugated diene monomer unit, it is preferred for the polymer (a) to comprise at least one polymer block (S) primarily comprising a vinyl aromatic monomer unit.

From the viewpoint of the balance between stiffness and impact resistance, the polymer (a) is preferably a copolymer with a conjugated diene monomer unit.

In the present specification, the polymer block (S) refers to a polymer block primarily comprising a vinyl aromatic monomer unit, and the polymer block (B) refers to a polymer block primarily comprising a conjugated diene monomer unit.

Such a polymer (a) is not limited, and examples thereof include polymers having the following block structures represented by each of the general formulas:

S (homopolymer of vinyl aromatic monomer)
S1-B1
S1-B/S1
S1-B1-S2
S1-B/S1-S2
S1-B1-S2-B2
S1-B/S1-S2-B/S2
S1-B/S1-B/S2-S2
S1-B1-S2-B2-S3

(in the general formulas, S denotes a polymer block (S) primarily comprising a vinyl aromatic monomer unit; B denotes a polymer block (B) primarily comprising a conjugated diene monomer unit; and B/S denotes a random copolymer block (B/S) in which the contents of the vinyl aromatic monomer unit and the conjugated diene copolymer unit are each less than 90% by mass.)

In the above formulas each representing a block structure, numbers after S, B, and B/S are numbers for identifying a polymer block (S), a polymer block (B), and a random copolymer block (B/S), respectively, and blocks with different numbers may be the same or different in molecular weight (degree of polymerization) or copolymerization ratio.

The polymer block (S) and polymer block (B) may each have a continuous structure of blocks having different components or compositions. Specifically, the polymer block (B) may be B1-B2-B3 (B1, B2, and B3 are blocks B having different compositions or components), for example.

The chain structure of the random copolymer block (B/S) may be a random block or tapered block (a block in which the composition ratio gradually changes along the chain).

The polymer (a) may be a linear polymer or a branched polymer.

Examples of methods for obtaining a branched polymer include a method of subjecting polymer ends to coupling reaction, and a method of branching a polymer with a polyfunctional initiator at an early stage of polymerization.

In the case that the polymer (a) is a block copolymer, the polymer (a) is preferably a block copolymer in which the polymer block (S) primarily comprising a vinyl aromatic monomer unit is bonded to each end from the viewpoint of the mechanical characteristics such as impact resistance of the resin composition according to the present embodiments.

Here, the term "primarily comprising" used herein means that the content of a given monomer unit is 90% by mass or more. For example, "a polymer block primarily comprising a vinyl aromatic monomer unit" in the block copolymer (a) refers to a block comprising 90% by mass or more of a vinyl aromatic monomer unit and 10% by mass or less of a conjugated diene monomer unit. A polymer block comprising less than 90% by mass of a vinyl aromatic monomer unit and more than 10% by mass of a conjugated diene monomer unit is defined as a random copolymer block. The random copolymer block may have a completely-random structure or a tapered structure (a structure in which the copolymerization composition ratio gradually changes along the chain).

Description of the method for producing the polymer (a) overlaps in many parts with that for the block copolymer (b) described later, and thus the method for producing the polymer (a) will be described after description of the block copolymer (b) in a collective manner.

(Block Copolymer (b))

The block copolymer (b) comprises 15% by mass or more or and 50% by mass or less of a vinyl aromatic monomer unit and 50% by mass or more and 85% by mass or less of a conjugated diene monomer unit on the basis of the total amount of the block copolymer (b).

The block copolymer (b) may comprise an additional polymerizable compound unit other than the vinyl aromatic monomer unit and the conjugated diene monomer unit, as necessary.

The vinyl aromatic monomer included in the block copolymer (b) may be any compound having an aromatic ring and a vinyl group in the molecule, and examples thereof include, but not limited to, styrene, o-methylstyrene, m-methylstyrene, p-methylstyrene, o-ethylstyrene, p-ethylstyrene, p-tert-butylstyrene, 2,4-dimethylstyrene, 1,3-dimethylstyrene, α-methylstyrene, α-methyl-p-methylstyrene, vinylnaphthalene, vinylanthracene, and 1,1-diphenylethylene.

Particularly, styrene is common and preferred.

Only one of them may be used singly, or two or more thereof may be used in combination.

The conjugated diene monomer included in the block copolymer (b) may be any diolefin having a pair of conjugated double bonds, and examples thereof include, but not limited to, 1,3-butadiene, 2-methyl-1,3-butadiene (isoprene), 2,3-dimethyl-1,3-butadiene, 1,3-pentadiene, and 1,3-hexadiene.

In particular, 1,3-butadiene and isoprene are common and preferred.

Only one of them may be used singly, or two or more thereof may be used in combination.

The content of the vinyl aromatic monomer unit in the block copolymer (b) is 15% by mass or more and 50% by mass or less, preferably 15% by mass or more and 45% by mass or less, preferably 20% by mass or more and 42% by mass or less, and more preferably 30% by mass or more and 40% by mass or less based on the total amount of the block copolymer (b).

The content of the conjugated diene monomer unit in the block copolymer (b) is 50% by mass or more and 85% by mass or less, preferably 55% by mass or more and 85% by mass or less, preferably 58% by mass or more and 80% by mass or less, and more preferably 60% by mass or more and 70% by mass or less based on the total amount of the block copolymer (b).

Use of the block copolymer (b) in which the contents of the vinyl aromatic monomer unit and conjugated diene monomer unit fall within the above ranges provides a resin composition having excellent balance between stiffness and impact resistance.

The content of the vinyl aromatic monomer unit and the content of the conjugated diene monomer unit in the block copolymer (b) can be measured with a UV meter (ultraviolet ray absorptiometer), specifically, in accordance with a method described later in Examples.

The block copolymer (b) preferably comprises at least one polymer block (S) primarily comprising a vinyl aromatic monomer unit.

In addition, the block copolymer (b) preferably further comprises at least one random copolymer block (B/S) comprising a vinyl aromatic monomer unit and a conjugated diene monomer unit.

The copolymer block (B/S) further included in the block copolymer (b) tends to improve the impact resistance.

The block copolymer (b) preferably comprises at least two polymer blocks (S). A block copolymer (b) comprising at least two polymer blocks (S) tends to improve the mechanical characteristics such as impact resistance, yield strength, and breaking elongation.

Such a block polymer (b) is not limited, and examples thereof include block polymers having the following block structures represented by the general formulas:

S1-B1
S1-B/S1
S1-B1-S2
S1-B/S1-S2
S1-B/S1-S2-B/S2
S1-B/S1-B/S2-S2
S1-B1-B/S1-S2
S1-B1-B/S1-B2-S2
S1-B1-S2-B2-S3

(in the general formulas, S denotes a polymer block (S) primarily comprising a vinyl aromatic monomer unit; B denotes a polymer block (B) primarily comprising a conjugated diene monomer unit; and B/S denotes a random copolymer block (B/S) in which the contents of the vinyl aromatic monomer unit and the contents of the conjugated diene monomer unit are each less than 90% by mass.)

In the above formulas each representing a block structure, numbers after S, B, and B/S are numbers for identifying a polymer block (S), a polymer block (B), and a random copolymer block (B/S), respectively, and blocks with different numbers may be the same or different in molecular weight (degree of polymerization) or copolymerization ratio.

The chain structure of the random copolymer block (B/S) may be a random block or tapered block (a block in which the composition ratio gradually changes along the chain).

The block copolymer (b) may be a linear block copolymer or a branched block copolymer, but preferably a linear block copolymer from the viewpoint of balance between moldability and impact resistance.

In addition, the block copolymer (b) is preferably a block copolymer in which the polymer block (S) is bonded to each end from the viewpoint of the mechanical characteristics of the resin composition.

As describe above, the block copolymer (b) preferably further comprises at least one random copolymer block (B/S) comprising a vinyl aromatic monomer unit and a conjugated diene monomer unit.

The copolymerization ratio between B and S of the random copolymer block (B/S) can be controlled through adjustment of the ratio of a vinyl aromatic monomer to a conjugated diene monomer in a mixture. As described later, a method in which a mixture of them is continuously supplied to a polymerization system for polymerization, and/or a method in which a vinyl aromatic monomer and a conjugated diene monomer are copolymerized with a polar compound or randomizer can be employed, for example.

The proportion of the vinyl aromatic monomer unit included in the polymer block (S) (hereinafter, also referred to as "percentage of the polymer block (S)") is preferably 50 to 90% by mass, more preferably 55 to 85% by mass, and further preferably 60 to 80% by mass based on the total amount of the vinyl aromatic monomer unit in the block copolymer (b).

The proportion of the vinyl aromatic monomer unit included in the polymer block (S) (percentage of the polymer block (S)) in the above range tends to provide a resin composition which is excellent in heat-aging resistance, effectively exerts impact resistance, and is also excellent in balance between stiffness and impact resistance.

In addition, the percentage of the polymer block (S) in the above range enables control of the tan δ peak of dynamic viscoelasticity of the resin composition in the range of −70 to −40° C.

The percentage of the polymer block (S) in the block copolymer (b) can be controlled by changing the mass ratio between the vinyl aromatic monomer and the conjugated diene monomer in the random copolymer block (B/S) in the block copolymer (b), i.e., adjusting the ratio between the amounts of these starting materials to be charged.

The percentage of the polymer block (S) in the block copolymer (b) can be calculated by dividing the weight of the polymer block (S) component (excluding a polymer-constituting component of a vinyl aromatic monomer having an average degree of polymerization of about 30 or less) obtained in accordance with a method in which a block copolymer is oxidatively decomposed by di-tert-butyl hydroperoxide with osmium tetroxide as a catalyst (a method described in I. M. KOLTHOFF, et al., J. Polym. Sci. 1, 429 (1946)) by the total weight of the vinyl aromatic monomer in the block copolymer (b).

(Method for Producing Polymer (a) and Block Copolymer (b))

The polymer (a) can be obtained by polymerizing a vinyl aromatic monomer or copolymerizing a vinyl aromatic monomer and a conjugated diene monomer, as necessary, in a hydrocarbon solvent.

The block copolymer (b) can be obtained by copolymerizing a vinyl aromatic monomer and a conjugated diene monomer with a polymerization initiator in a hydrocarbon solvent.

The hydrocarbon solvent to be used for producing the polymer (a) and the block copolymer (b) may be a conventionally-known hydrocarbon solvent, and examples thereof include, but not limited to, aliphatic hydrocarbons such as n-butane, isobutane, n-pentane, n-hexane, n-heptane, and n-octane; alicyclic hydrocarbons such as cyclopentane, methylcyclopentane, cyclohexane, methylcyclohexane, cycloheptane, and methylcycloheptane; and aromatic monomers such as benzene, toluene, xylene, and ethylbenzene.

Only one of them may be used singly, or two or more thereof may be used in a mixture.

Among them, n-hexane and cyclohexane are common and preferably used in the case that an organic lithium initiator is used.

The polymer (a) preferably comprises a homopolymer of a vinyl aromatic monomer comprising 100% by mass of a vinyl aromatic monomer unit. In the case that the polymer (a) is a copolymer comprising a conjugated diene monomer unit, the production method is typically based on anionic polymerization with a polymerization initiator such as an organic lithium compound. In the case that the polymer (a) is a homopolymer of a vinyl aromatic monomer, in contrast, not only a production method based on anionic polymerization, but also a production method based on radical polymerization, which has been industrially common, is applicable, and thus the production method is not limited. Radical polymerization includes polymerization with a heated radical and polymerization with an initiator radical, and both of them can be suitably used. A chain transfer agent or a polymerization aid may be used, as necessary.

Examples of the polymerization initiator include, but not limited to, alkali metal compounds such as aliphatic hydrocarbon-alkali metal compounds, aromatic monomer-alkali metal compounds, and organic amino-alkali metal compounds, each of which is known to have an anionic polymerization activity to a conjugated diene monomer and a vinyl aromatic monomer.

A known technique can be used for the method for producing the polymer (a) and block copolymer (b) included in the block copolymer composition according to the present embodiments.

Each of the techniques exemplified in the following is a method of subjecting a conjugated diene monomer and a vinyl aromatic monomer to block copolymerization in a hydrocarbon solvent with an anionic initiator such as an organic lithium compound.

For example, production can be performed in accordance with a method described in Japanese Patent Publication No. 36-19286, Japanese Patent Publication No. 43-17979, Japanese Patent Publication No. 48-2423, Japanese Patent Publication No. 49-36957, Japanese Patent Publication No. 57-49567, or Japanese Patent Publication No. 58-11446.

Examples of the alkali metal in the alkali metal compound include, but not limited to, lithium, sodium, and potassium.

Examples of suitable alkali metal compounds include, but not limited to, $C_{1-20}$ aliphatic and aromatic hydrocarbon-lithium compounds containing one lithium atom per molecule, and those containing a plurality of lithium atoms per molecule such as dilithium compounds, trilithium compounds, and tetralithium compounds.

Specific examples of such alkali metal compounds include, but not limited to, n-propyllithium, n-butyllithium, sec-butyllithium, tert-butyllithium, hexamethylenedilithium, butadienyldilithium, isoprenyldilithium, a reaction product of diisopropenylbenzene and sec-butyllithium, and further a reaction product of divinylbenzene, sec-butyllithium, and a small amount of 1,3-butadiene.

In addition, organic alkali metal compounds disclosed in a foreign patent of U.S. Pat. No. 5,708,092, British Patent No. 2,241,239, and U.S. Pat. No. 5,527,753 may be used.

Only one of them may be used singly, or two or more thereof may be used in a mixture. In particular, n-butyl-lithium is common and preferably used.

The content of the vinyl aromatic monomer unit and the content of the conjugated diene monomer unit in the polymer (a) and the block copolymer (b), each of which is to be obtained finally, can be controlled by adjusting the charging ratio between a vinyl aromatic monomer and a conjugated diene monomer as starting materials for polymerization in a process for producing each of the polymer (a) and the block copolymer (b).

Since stirring is performed in a polymerization reaction chamber to polymerize in a homogeneous system, the polymer (a) and the block copolymer (b) cannot be produced simultaneously in one polymerization reaction chamber, and thus they are separately polymerized for production.

In the case that a random copolymer block is introduced into the polymer (a) comprising a conjugated diene monomer component and the block copolymer (b), examples of methods for producing a random copolymer block include a method in which a mixture of a vinyl aromatic monomer and a conjugated diene monomer is continuously supplied to a polymerization system for polymerization, and a method in which a vinyl aromatic monomer and a conjugated diene monomer are copolymerized with a polar compound or randomizer.

Examples of the polar compound or randomizer include, but not limited to, ethers such as tetrahydrofuran, diethylene glycol dimethyl ether, and diethylene glycol dibutyl ether; amines such as triethylamine and tetramethylethylenediamine; thioethers; phosphines; phosphoramides; alkyl benzenesulfonates; and alkoxides of potassium and sodium.

The polymerization temperature in a polymerization process for the polymer (a) and the block copolymer (b) is, in the case of anionic polymerization with a polymerization initiator, typically in the range of −10° C. to 150° C., and preferably in the range of 40° C. to 120° C.

The time required for polymerization varies depending on the conditions, and is within 48 hours in typical cases, and preferably in the range of 1 to 10 hours.

It is preferred to replace the atmosphere in the polymerization system with an inert gas or the like such as nitrogen gas.

The polymerization pressure is not limited and may be any pressure in a range sufficient for maintaining the monomers and polymerization solvent in a solution layer in the above range of polymerization temperature.

In addition, it is preferred to take care so as not to allow an impurity which deactivates a catalyst and a living polymer, such as water, oxygen, and carbon dioxide gas, to contaminate the polymerization system.

In the case that a random copolymer block is included in the polymer (a) and/or the block copolymer (b), a method in which a mixture of a vinyl aromatic monomer and a conjugated diene monomer is continuously supplied to a polymerization system for polymerization, and/or a method in which a vinyl aromatic monomer and a conjugated diene monomer are copolymerized with a polar compound or randomizer can be employed, for example.

In the case that an organic alkali metal is used as a polymerization initiator in production of the polymer (a) and the block copolymer (b) as constituents of the block copolymer composition according to the present embodiments, coupling reaction, in which two or more molecules bond to each other to terminate polymerization reaction, can be suitably used for termination of polymerization reaction.

For coupling reaction, a coupling agent exemplified below can be added to the polymerization system. Through adjustment of the amount of a coupling agent to be added, only a part of the polymer in the polymerization system can be allowed to couple, and thus the coexistence of an uncoupled polymer and a coupled polymer can be achieved. Thereby, a polymer (a) and/or block copolymer (b) having two or more peaks in the molecular weight distribution can be produced.

Examples of coupling agents which can be suitably used for production of the polymer (a) and/or the block copolymer (b) constituting the block copolymer composition according to the present embodiments include, but not limited to, bifunctional or higher functional coupling agents.

Specific examples of such coupling agents include tetraglycidyl meta-xylenediamine, tetraglycidyl-1,3-bis(aminomethyl)cyclohexane, tetraglycidyl-p-phenylenediamine, tetraglycidyldiaminodiphenylmethane, diglycidylaniline, diglycidyl ortho-toluidine, γ-glycidoxyethyltrimethoxysilane, γ-glycidoxypropyltrimethoxysilane, γ-glycidoxybutyltrimethoxysilane, γ-glycidoxypropyltriethoxysilane, γ-glycidoxypropyltripropoxysilane, and γ-glycidoxypropyltributoxysilane.

Further examples of such coupling agents include 1-[3-(triethoxysilyl)-propyl]-4-methylpiperazine, 1-[3-(diethoxyethylsilyl)-propyl]-4-methylpiperazine, 1-[3-(trimethoxysilyl)-propyl]-3-methylimidazolidine, 1-[3-(diethoxyethylsilyl)-propyl]-3-ethylimidazolidine, 1-[3-(triethoxysilyl)-propyl]-3-methylhexahydropyrimidine, 1-[3-(dimethoxymethylsilyl)-propyl]-3-methylhexahydropyrimidine, 3-[3-(tributoxysilyl)-propyl]-1-methyl-1,2,3,4-tetrahydropyrimidine, 3-[3-(dimethoxymethylsilyl)-propyl]-1-ethyl-1,2,3,4-tetrahydropyrimidine, 1-(2-ethoxyethyl)-3-[3-(trimethoxysilyl)-propyl]-imidazolidine, and (2-{3-[3-(trimethoxysilyl)-propyl]-tetrahydropyrimidine-1-yl}-ethyl)dimethylamine.

Further examples of such coupling agents include γ-glycidoxypropyltriphenoxysilane, γ-glycidoxypropylmethyldimethoxysilane, γ-glycidoxypropylethyldimethoxysilane, γ-glycidoxypropylethyldiethoxysilane, γ-glycidoxypropylmethyldiethoxysilane, γ-glycidoxypropylmethyldipropoxysilane, γ-glycidoxypropylmethyldibutoxysilane, γ-glycidoxypropylmethyldiphenoxysilane, γ-glycidoxypropyldimethylmethoxysilane, γ-glycidoxypropyldiethylethoxysilane, γ-glycidoxypropyldimethylethoxysilane, and γ-glycidoxypropyldimethylphenoxysilane.

Further examples of such coupling agents include γ-glycidoxypropyldiethylmethoxysilane, γ-glycidoxypropylmethyldiisopropenoxysilane, bis(γ-glycidoxypropyl)dimethoxysilane, bis(γ-glycidoxypropyl)diethoxysilane, bis(γ-glycidoxypropyl)dipropoxysilane, bis(γ-glycidoxypropyl)dibutoxysilane, bis(γ-glycidoxypropyl)diphenoxysilane, bis(γ-glycidoxypropyl)methylmethoxysilane, bis(γ-glycidoxypropyl)methylethoxysilane, bis(γ-glycidoxypropyl)methylpropoxysilane, bis(γ-glycidoxypropyl)methylbutoxysilane, and bis(γ-glycidoxypropyl)methylphenoxysilane.

Further examples of coupling agents include tris(γ-glycidoxypropyl)methoxysilane, γ-methacryloxypropyltrimethoxysilane, γ-methacryloxypropyltriethoxysilane, γ-methacryloxymethyltrimethoxysilane, γ-methacryloxyethyltriethoxysilane, bis(γ-methacryloxypropyl)dimethoxysilane, tris(γ-methacryloxypropyl)methoxysilane, β-(3,4-epoxycyclohexyl)ethyl-trimethoxysilane, β-(3,4-epoxycyclohexyl)ethyl-triethoxysilane, β-(3,4- epoxycyclohexyl)ethyl-tripropoxysilane, β-(3,4-epoxycyclohexyl)ethyl-tributoxysilane, and β-(3,4-epoxycyclohexyl)ethyl-triphenoxysilane.

Further examples of such coupling agents include β-(3,4-epoxycyclohexyl)propyl-trimethoxysilane, β-(3,4-epoxycyclohexyl)ethyl-methyldimethoxysilane, β-(3,4-epoxycyclohexyl)ethyl-ethyldimethoxysilane, β-(3,4-epoxycyclohexyl)ethyl-ethyldiethoxysilane, β-(3,4-epoxycyclohexyl)ethyl-methyldiethoxysilane, β-(3,4-epoxycyclohexyl)ethyl-methyldipropoxysilane, β-(3,4-epoxycyclohexyl)ethyl-methyldibutoxysilane, β-(3,4-epoxycyclohexyl)ethyl-methyldiphenoxysilane, β-(3,4-epoxycyclohexyl)ethyl-dimethylmethoxysilane, and β-(3,4-epoxycyclohexyl)ethyl-diethylethoxysilane.

Further examples of such coupling agents include β-(3,4-epoxycyclohexyl)ethyl-dimethylethoxysilane, β-(3,4-epoxycyclohexyl)ethyl-dimethylpropoxysilane, β-(3,4-epoxycyclohexyl)ethyl-dimethylbutoxysilane, β-(3,4-epoxycyclohexyl)ethyl-dimethylphenoxysilane, β-(3,4-epoxycyclohexyl)ethyl-diethylmethoxysilane, β-(3,4-epoxycyclohexyl)ethyl-methyldiisopropenoxysilane, 1,3-dimethyl-2-imidazolidinone, 1,3-diethyl-2-imidazolidinone, N,N'-dimethylpropyleneurea, and N-methylpyrrolidone.

In the case that the coupling agent is allowed to undergo addition reaction to a living end of the polymer (a) and/or the block copolymer (b), the structure of a living end of the polymer is not limited at all. However, the living end is preferably a living end of a block primarily comprising a vinyl aromatic monomer from the viewpoint of the mechanical strength or the like of the block copolymer composition according to the present embodiments.

The amount of the coupling agent to be used is preferably 0.1 equivalents or more and 10 equivalents or less, and more preferably 0.5 equivalents or more and 4 equivalents or less relative to 1 equivalent of a living end of the polymer (a) and/or the block copolymer (b).

Only one of the coupling agents may be used singly, or two or more thereof may be used in combination.

(Method for Producing Block Copolymer Composition)

After the polymer (a) and the block copolymer (b) are produced by using the above-described method, the block copolymer composition according to the present embodiments can be produced by applying a known blending method.

Specific examples of such blending methods include a method in which heat-melt-kneading with a known kneading machine such as a roll, a mixer, a kneader, a Banbury mixer, and an (single-screw or twin-screw) extruder is performed to obtain the block copolymer composition, and a method in which a solution with the polymer (a) and the block copolymer (b) dissolved in an organic solvent or the like is stirred and mixed, and the solvent is then removed through any method such as heating and reducing the pressure to obtain the block copolymer composition.

The method in which a solution is stirred and mixed, and desolventizing is then performed to obtain the block copolymer composition is preferred from the viewpoint of degradation of the polymer in accordance with the thermal history.

[Molded Material]

The molded material according to the present embodiments is a molded material comprising a block copolymer composition comprising:

a polymer (a) comprising more than 95% by mass and 100% by mass or less of a vinyl aromatic monomer unit and 0% by mass or more and less than 5% by mass of a conjugated diene monomer unit; and a block copolymer (b) comprising 15% by mass or more and 50% by mass or less of a vinyl aromatic monomer unit and 50% by mass or more and 85% by mass or less of a conjugated diene monomer unit, wherein the mass ratio of the polymer (a) to the block copolymer (b) satisfies (a)/(b)=70/30 to 30/70.

The term "molded material" refers to a composition in a form processable into an intended molded product such as an intermediate product and a final product through heating with a molded machine or kneading machine to melt a block copolymer composition comprising the polymer (a) and the block copolymer (b), or a mixture thereof with one or more arbitrary additional materials at an arbitrary ratio followed by re-cooling.

Examples of the molded material according to the present embodiments include compositions in powders, pellets, clams, or flakes. These can be produced with a mechanical apparatus such as a pelletizer and a grinder.

The molded material is preferably in pellets from the viewpoint of homogeneous mixing.

It is preferred to uniform the particle diameter of pellets in a certain range because the pellets become less likely to be sorted in dry-blending.

The average diameter of the pellets as the average of the major axis and the minor axis is preferably 0.1 mm or larger and 5 mm or less, and more preferably 1 mm or larger and 4 mm or less.

The shape of the pellets is not limited at all, and a cylinder finished by strand cutting and a sphere finished by cutting in water are industrially common, and preferably used.

[Resin Composition]

The block copolymer composition according to the present embodiments is extremely useful for a modifier for a resin composition having excellent impact resistance and high stiffness in combination, especially, a resin composition to provide a highly-modified polystyrene resin sheet.

The resin composition according to the present embodiments, a resin composition with the above-described block copolymer composition according to the present embodiments blended therein, comprises a rubber-modified vinyl aromatic polymer (c) to be modified and the block copolymer composition. Moreover, the resin composition according to the present embodiments may be a resin composition comprising a rubber-modified vinyl aromatic polymer (c), a vinyl aromatic-based polymer (d), and the block copolymer composition, in accordance with the intended use or purpose.

In the case that the rubber-modified vinyl aromatic polymer (c) is modified with the block copolymer composition according to the present embodiments to obtain the resin composition according to the present embodiments, the resin composition according to the present embodiments preferably comprises 80% by mass or more and 99% by mass or less of the rubber-modified vinyl aromatic polymer (c) and 1% by mass or more and 20% by mass or less of the block copolymer composition.

The resin composition according to the present embodiments more preferably comprises 82% by mass or more and 96% by mass or less of the rubber-modified vinyl aromatic polymer (c) and 4% by mass or more and 18% by mass or less of the block copolymer composition, and further preferably comprises 84% by mass or more and 94% by mass or less of the rubber-modified vinyl aromatic polymer (c) and 6% by mass or more and 16% by mass or less of the block copolymer composition.

In particular, the resin composition according to the present embodiments comprising 1% by mass or more of the block copolymer composition provides a sheet less likely to tear in the longitudinal direction when a stress is applied to the sheet, in other words, improves what is called crack resistance, and the resin composition according to the present embodiments comprising 20% by mass or less of the block copolymer composition tends to further improve the balance between stiffness and impact resistance required for resin compositions.

If more than 20% by mass of the block copolymer composition is blended, the stiffness is further lowered, and the effect of improving the impact resistance becomes saturated.

The above-described composition range provides a resin composition excellent in balance between impact resistance and stiffness.

Further, the resin composition according to the present embodiments may comprise a vinyl aromatic-based polymer (d) in addition to the rubber-modified vinyl aromatic polymer (c).

In the case that the resin composition according to the present embodiments comprises a vinyl aromatic-based polymer (d), as typified by general-purpose polystyrene (GPPS), the resin composition according to the present embodiments preferably comprises more than 0% by mass and 80% by mass or less of the vinyl aromatic-based polymer (d), 10% by mass or more and 45% by mass or less of the rubber-modified vinyl aromatic polymer (c), and 10% by mass or more and 55% by mass or less of the block copolymer composition.

The resin composition according to the present embodiments more preferably comprises 25% by mass or more and 70% by mass or less of the vinyl aromatic-based polymer (d), 15% by mass or more and 30% by mass or less of the rubber-modified vinyl aromatic polymer (c), and 15% by mass or more and 45% by mass or less of the block copolymer composition, and further preferably comprises 30% by mass or more and 60% by mass or less of the vinyl aromatic-based polymer (d), 20% by mass or more and 30% by mass or less of the rubber-modified vinyl aromatic polymer (c), and 20% by mass or more and 40% by mass or less of the block copolymer composition.

In particular, the resin composition according to the present embodiments comprising 10% by mass or more of the block copolymer composition provides improved toughness, and thus a molded product less likely to break when a stress is applied can be obtained.

The resin composition according to the present embodiments comprising 55% by mass or less, in particular, 25% by mass or less of the block copolymer composition, tends to provide an extruded sheet to be obtained with satisfactory isotropy, the sheet being less likely to tear in the longitudinal direction, in other words, improve what is called crack resistance.

The above-described composition range provides a resin composition excellent in balance between impact resistance and stiffness.

Although the method for producing the resin composition according to the present embodiments is not limited at all, the effect due to blending the block copolymer composition according to the present embodiments is exerted especially when sheet molding is performed by using a sheet extruder with a T-die.

For T-die sheet molding, "dry-blend molding" is commonly used, in which each starting material is charged via the corresponding special hopper, and the starting materials are melt-kneaded in the extruder, and the melted resin discharged from the T-die is then rolled up with a roll while being cooled, and thus a sheet is produced, in other words, melt molding is directly performed without preliminary kneading.

Here, "dry-blending" refers to mixing the polymer (a) and the block copolymer (b) each in a solid state, such as a particle and a pellet, before being melted together.

To efficiently disperse an SBS elastomer under a limited extruder length, a resin composition comprising a polymer (a) having a high styrene component ratio and a block copolymer (b) blended in advance is used as a modifier. Thereby, an extremely higher modifying effect can be achieved than in the case of a sheet obtained through charging an SBS elastomer singly without preliminary blending.

Now, the rubber-modified vinyl aromatic polymer (c) and the vinyl aromatic-based polymer (d) will be described.

(Rubber-Modified Vinyl Aromatic Polymer (c))

For the rubber-modified vinyl aromatic polymer (c), for example, a substance known as a high impact polystyrene (HIPS) can be suitably used, but the rubber-modified vinyl aromatic polymer (c) is not limited thereto.

(Method for Producing Rubber-Modified Vinyl Aromatic Polymer (c))

The rubber-modified vinyl aromatic polymer (c) can be industrially produced through a radical polymerization method by using a continuous bulk polymerization method, a suspension polymerization method, or an emulsion polymerization method in the presence of a rubbery polymer.

Examples of the rubbery polymer to be used as a starting material of the rubber-modified vinyl aromatic polymer (c) include homopolymers and copolymers primarily comprising a conjugated diene monomer such as butadiene and isoprene, and/or hydrogenated products thereof, and copolymer rubbers with a vinyl aromatic monomer such as styrene are also included in preferred examples of the rubbery polymer.

(Grafted Rubber Particles in Rubber-Modified Vinyl Aromatic Polymer (c))

The rubber-modified vinyl aromatic polymer (c) contains grafted rubber particles.

The grafted rubber particle comprises the above rubbery polymer graft-polymerized with a vinyl aromatic monomer. Stirring the polymerization system causes phase inversion, and the sheer due to the stirring allows formation of the grafted rubber particle. The average particle diameter of the grafted rubber can be set to an intended average particle diameter through control of the viscosity of the solution and the stirring speed.

The content of the conjugated diene monomer unit derived from the rubbery polymer included in the rubber-modified vinyl aromatic polymer (c) is commonly in the range of 3 to 20% by mass, and this range is preferred.

The amount of the conjugated diene monomer derived from the rubbery polymer can be quantified through a calibration curve method with a known sample by using a pyrolysis gas chromatograph.

The average particle diameter of the grafted rubber particle contained in the rubber-modified vinyl aromatic polymer (c) is commonly in the range of 1.0 µm to 5.0 µm, and this range is preferred, and the average particle diameter is more preferably 2.0 µm to 5.0 µm, and further preferably 2.2 µm to 4.0 µm. Use of the rubber-modified vinyl aromatic polymer (c) having an average particle diameter in the above range provides a sheet product having satisfactory balance of physical properties.

The method for measuring the average particle diameter of the grafted rubber particle is as follows.

First, the rubber-modified vinyl aromatic polymer (c) is stained with osmium tetroxide, from which an ultrathin section having a thickness of 75 nm is prepared, and a photograph is taken at a magnification of 10000× with a transmission electron microscope.

Since the grafted rubber particle can be easily identified even in the case that the rubber-modified vinyl aromatic polymer (c) is not in a single configuration but blended in the resin composition together with the block copolymer composition, measurement may be performed for the resin composition comprising the block copolymer composition blended therein.

Subsequently, the diameter of each rubber particle stained black in the photograph is measured, and the average particle diameter is calculated by using the following equation:

(Average particle diameter)=$\Sigma nDi^4/\Sigma nDi^3$ n: the number of rubber particles with a major axis of Di Some grafted rubber particles comprises polystyrene in the inside, in other words, have what is called a salami structure or core-shell structure.

(Melt Flow Rate of Rubber-Modified Vinyl Aromatic Polymer (c))

The melt flow rate (ISO 1133, temperature: 200° C., load: 5 kgf) of the rubber-modified vinyl aromatic polymer (c) is preferably 0.1 to 50 g/10 min, more preferably 0.5 to 20 g/10 min, and further preferably 1 to 10 g/10 min.

The melt flow rate of the rubber-modified vinyl aromatic polymer (c) in the above range tends to improve the appearance when molded and impact resistance of the resin composition according to the present embodiments and the molded product.

(Vinyl Aromatic-Based Polymer (d))

The vinyl aromatic-based polymer (d) to be used for the resin composition according to the present embodiments is a polymer comprising only a vinyl aromatic monomer, or a copolymer obtained through copolymerization of a vinyl aromatic monomer and a monomer copolymerizable with a vinyl aromatic monomer.

The vinyl aromatic monomer is not limited and may be any compound having an aromatic ring and a vinyl group in the molecule, and examples thereof include styrene, o-methylstyrene, m-methylstyrene, p-methylstyrene, o-ethylstyrene, p-ethylstyrene, p-tert-butylstyrene, 2,4-dimethylstyrene, 1,3-dimethylstyrene, α-methylstyrene, α-methyl-p-methylstyrene, vinylnaphthalene, vinylanthracene, and 1,1-diphenylethylene.

Particularly, styrene is common and preferred.

Only one of them may be used singly, or two or more thereof may be used in combination.

In the resin composition according to the present embodiments, the vinyl aromatic-based polymer (d) may be the same as or different from the polymer (a). Particularly in the case that the polymer (a) is a homopolymer comprising only a vinyl aromatic monomer, the vinyl aromatic-based polymer (d) may be the same as the polymer (a). In this case, the polymer (a) and the vinyl aromatic-based polymer (d) can be discriminated: specifically, a part being compatible with the component (b) as a constituent of the block copolymer composition according to the present embodiments is the polymer (a), and the other part is the vinyl aromatic-based polymer (d).

Examples of monomers copolymerizable with a vinyl aromatic monomer include (meth)acrylic acid and/or alkyl (meth)acrylate compounds, acrylonitrile, and maleic anhydride.

The number of carbon atoms in the alkyl group of an alkyl (meth)acrylate compound is commonly 1 to 20, and this number is preferred. Examples of such alkyl groups include methyl, ethyl, propyl, isopropyl, n-butyl, isobutyl, sec-butyl, tert-butyl, pentyl, hexyl, octyl, 2-ethylhexyl, dodecyl, lauryl, palmityl, stearyl, and cyclohexyl. In particular $C_{1-4}$ alkyl groups are preferred.

The most versatile vinyl aromatic polymer is polystyrene (GPPS) industrially produced through radical polymerization, and GPPS can be suitably used for the resin composition according to the present embodiments. In addition, a styrene-α-methylstyrene copolymer resin, styrene-butyl acrylate copolymer resin, styrene-methyl methacrylate copolymer resin, styrene-acrylonitrile copolymer resin, or the like can be used.

(Melt Flow Rate of Vinyl Aromatic-Based Polymer (d))

The melt flow rate (ISO 1133, temperature: 200° C., load: 5 kgf) of the vinyl aromatic-based polymer (d) is preferably 0.1 to 50 g/10 min, more preferably 0.5 to 20 g/10 min, and further preferably 1 to 10 g/10 min.

The melt flow rate of the vinyl aromatic-based polymer (d) in the above range tends to improve the appearance when molded and impact resistance of the resin composition according to the present embodiments and the molded product obtained therefrom.

(Additional Polymer, Additive, or the Like)

An additional polymer, an additive, or the like may be blended, as necessary, in the resin composition according to the present embodiments.

For example, a heat stabilizer such as an antioxidant to suppress thermal degradation or oxidative degradation due to heating in kneading of components or molding can be preferably added.

The content of the heat stabilizer is preferably 0.1 to 1.5% by mass based on the total amount of the resin composition. The content of the additive in the above range allows the additive to sufficiently exert its effect.

Examples of the additive include, but not limited to, heat stabilizers such as 2-t-butyl-6(3-t-butyl-2-hydroxy-5-methylbenzyl)-4-methylphenyl acrylate, and antioxidants such as n-octadecyl-β-(4'-hydroxy-3',5'-di-t-butylphenyl propionate, and pentaerythritol tetrakis[3-(3',5'-di-t-butyl-4'-hydroxyphenyl)propionate], and they can be preferably used.

The other additive is not limited as long as the additive is commonly used for thermoplastic resins, and examples thereof include inorganic fillers such as glass fiber, glass beads, silica, calcium carbonate, and talk; organic fillers such as organic fibers and coumarone-indene resins; cross-linking agents such as organic peroxides and inorganic peroxides; inorganic pigments such as titanium oxide, carbon black, and iron oxide; organic pigments such as copper phthalocyanine; organic dyes of blue, red, purple, yellow, and so on; flame retardants; ultraviolet absorbers; antistatic agents; lubricants such as fatty acids, fatty acid amides, fatty acid esters, and metal salts of a fatty acid; and oils such as mineral oils and silicone oils.

Only one of them may be used singly, or two or more thereof may be used in combination.

[Molded Product]

The molded product according to the present embodiments can be obtained through molding the above resin composition by using any molding method.

The aspect of the molded product is not limited, and examples thereof include a sheet continuously formed through extrusion molding by using an extruder with a T-die, and in the case of such a sheet, the sheet may be a monolayer sheet or a laminated sheet, or the molded product may be a deep-drawn container obtained by molding a molded material in pellets, strands, or the like.

In particular, the resin composition according to the present embodiments is the most suitable for a sheet continuously formed through extrusion molding by using an extruder with a T-die, and a deep-drawn molded product obtained from the sheet after secondary molding such as vacuum forming and compression molding. Examples of deep-drawn molded products include bowl-molded food containers and packaging containers for non-food applications.

The step of producing the resin composition and the step of producing the molded product may be consecutive, or not.

In sheet extrusion molding, in some cases, wastes in sheet fragments generated after molding of a container or the like are ground and returned for feeding of starting materials, and reused through blending again with a newly-supplied molded material.

For example, general-purpose polystyrene (GPPS) can be provided with strength through stretching. Utilizing this feature, GPPS is processed into oriented polystyrene (also referred to as OPS) by using an extruder provided with a stretching machine, and OPS is commonly used for top covers for lunchboxes.

In the course of processing into top covers, wastes in sheet fragments are inevitably generated. In the wastes in fragments, a small amount of rubber-modified polystyrene (HIPS) and the block copolymer composition according to the present embodiments are blended, and thus a resin composition having mechanical characteristics similar to those of single, unused rubber-modified polystyrene can be obtained.

This method can be applied to used foamed polystyrene containers, where the foamed polystyrene container is a packaging container obtained through processing general-purpose polystyrene as a starting material. Accordingly, the present invention contributes to reduction of waste resins, and thus is extremely useful from the viewpoint of effective use of resources.

[Method for Producing Molded Product]

First, the resin composition according to the present embodiments is produced, and the resin composition is then molded, and thus the molded product according to the present embodiments can be obtained.

The resin composition according to the present embodiments can be produced in accordance with a conventionally-known kneading/mixing method.

Examples of such methods include melt-kneading methods with a known kneading machine such as a roll, a mixer, a kneader, a Banbury mixer, and an (single-screw or twin-screw) extruder; a method in which, in molding of a molded product, a plurality of materials are dry-blended and mixed during a melting process in a molding machine; a method in which a solution with the components dissolved in an organic solvent or the like is stirred and mixed, and the solvent is then removed through any method such as heating and reducing the pressure to obtain a mixture; and combinations of them, for example, a method in which a solution with a part of the components dissolved in an organic solvent or the like is stirred and mixed, and the solvent is then removed through any method such as heating and reducing the pressure to partially obtain a mixture, followed by and in combination with the above-mentioned melt-kneading method with a kneading machine or the method of mixing during a melting process in a molding machine.

In a specific example, each starting material of the block copolymer composition comprising the polymer (a) and the block copolymer (b) blended in advance and the rubber-modified vinyl aromatic polymer (c), and the vinyl aromatic-based polymer (d), as necessary, is charged into the corresponding special hopper; the starting materials are subjected to extrusion molding with dry-blending by using a sheet extruder with a heating cylinder, a T-die, and a forming roll; and after the melting process, a molded product in a sheet comprising a homogeneously mixed resin composition is obtained.

In this case, the mixing method to obtain the block copolymer composition in advance from the polymer (a) and the block copolymer (b) is not limited at all. In addition to a "melt-kneading blending" method, in which melting and mixing is performed by using a thermal kneading machine, a "solution blending" method, in which mixing is performed for a polymer solution immediately after polymerization reaction and desolventizing is then performed to finish into a molded material, can be suitably employed.

Although any of "melt-kneading blending" and "solution blending" is suitably applicable to the block copolymer composition according to the present embodiments and the molded material comprising the block copolymer composition, production by using solution blending is more preferred from the viewpoint of the quality due to the short thermal history.

A known technique can be used for the production method by using solution blending. Examples thereof include a method described in Japanese Patent Laid-Open No. 2008-231371.

After the resin composition according to the present embodiments is obtained, the resin composition is molded, and thus the molded product according to the present embodiments can be obtained.

The molded product according to the present embodiments can be produced through a known molding method. Examples of molding methods include, but not limited to, injection molding, T-die sheet extrusion molding, profile extrusion molding, blow molding, injection blow molding, and inflation molding.

In addition, the molded product can be subjected to reprocessing through secondary molding. Representative examples of such reprocessing include molding of a deep-drawn container through re-heating of a sheet obtained through T-die extrusion molding followed by pressing or vacuum forming for the re-heated sheet.

The resin composition comprising the block copolymer composition according to the present embodiments blended therein as a modifier can be used for production of any molded product, and in particular can be suitably used for a molded product in a sheet obtained through T-die sheet extrusion molding with "dry-blend molding", in which melt molding is directly performed without preliminary kneading, and a molded product having a shape of a deep-drawn container obtained through secondary molding of the molded product in a sheet, from the viewpoint of development of excellent modifying effect, which is the essence of the present embodiments. In these cases, the advantageous effects of the present invention are exerted best.

In the case that a sheet is formed as the molded product according to the present embodiments, the thickness of the sheet is not limited. However, the thickness is preferably 0.1 mm to 4 mm, more preferably 0.4 mm to 2.5 mm, and further preferably 1 mm to 2 mm.

The sheet may be monolayer or laminated.

Here, the term "laminated" means a laminated sheet comprising two or more resin compositions, the laminated sheet comprising at least one or more layers comprising the resin composition according to the present embodiments.

Although the method for forming a sheet is not limited at all, a method of molding by using a sheet extruder with a heating cylinder, a T-die, and a roll forming machine is common and preferred.

EXAMPLES

Hereinafter, the present invention will be described with reference to specific Examples and Comparative Examples. However, the present invention is never limited to the following Examples.

Polymers (a), block copolymers (b), a rubber-modified vinyl aromatic polymer (c), and vinyl aromatic polymers (d) for materials of block copolymer compositions will be described in the following.

[Materials of Block Copolymer Compositions]
(Polymer (a))
<Polymer (a)-1>

In a nitrogen gas atmosphere, 0.067 parts by mass of n-butyllithium was added to a cyclohexane solution containing 49.25 parts by mass of styrene at a concentration of 25% by mass, and the resultant was subjected to polymerization at 80° C. for 5 minutes. Then, a cyclohexane solution containing 1.5 parts by mass of 1,3-butadiene at a concentration of 25% by mass was added thereto, and the resultant was subjected to polymerization at 80° C. for 5 minutes.

Subsequently, a cyclohexane solution containing 49.25 parts by mass of styrene at a concentration of 25% by mass was added thereto, and the resultant was subjected to polymerization at 80° C. for 10 minutes. Then, tetraglycidil-1,3-bis(aminomethyl)cyclohexane in 0.5 equivalents relative to n-butyllithium was added thereto, and the resultant was reacted at 80° C. for 5 minutes.

Thereafter, ethanol in 0.6 equivalents relative to n-butyllithium was added in the reaction vessel to terminate the polymerization completely, and 0.2 parts by mass of 2-t-butyl-6-(3-t-butyl-2-hydroxy-5-methylbenzyl)-4-methylphenyl acrylate as a heat stabilizer on the basis of 100 parts by mass of the block copolymer was added to obtain a cyclohexane solution containing 25% by mass of a polymer (a)-1 dissolved therein.

The polymer (a)-1 thus obtained was a block copolymer having combination of an S1-B1-S2 structure with a styrene content of 98.5% by mass and a butadiene content of 1.5% by mass and a (S1-B1-S2)×3.5 structure formed through coupling of the S1-B1-S2 structure, and having two peak molecular weights.

<Polymer (a)-2>

In a nitrogen gas atmosphere, 0.067 parts by mass of n-butyllithium was added to a cyclohexane solution containing 49.25 parts by mass of styrene at a concentration of 25% by mass, and the resultant was subjected to polymerization at 75° C. for 5 minutes. Then, a cyclohexane solution containing 1.5 parts by mass of 1,3-butadiene at a concentration of 25% by mass was added thereto, and the resultant was subjected to polymerization at 75° C. for 5 minutes.

Subsequently, a cyclohexane solution containing 49.25 parts by mass of styrene at a concentration of 25% by mass was added thereto, and the resultant was subjected to polymerization at 65° C. for 10 minutes.

Thereafter, ethanol in 1.0 equivalent relative to n-butyllithium was added in the reaction vessel to terminate the polymerization completely, and 0.2 parts by mass of 2-t-butyl-6-(3-t-butyl-2-hydroxy-5-methylbenzyl)-4-methylphenyl acrylate as a heat stabilizer on the basis of 100 parts by mass of the block copolymer was added to obtain a cyclohexane solution containing 25% by mass of a polymer (a)-2 dissolved therein.

The polymer (a)-2 thus obtained was a block copolymer having an S1-B1-S2 structure with a styrene content of 98.5% by mass and a butadiene content of 1.5% by mass, and having one peak molecular weight.

<Polymer (a)-3>

In a nitrogen gas atmosphere, 0.070 parts by mass of n-butyllithium and 0.015 parts by mass of tetramethylmethylenediamine were added to a cyclohexane solution containing 47 parts by mass of styrene at a concentration of 25% by mass, and the resultant was subjected to polymerization at 80° C. for 10 minutes. Then, a cyclohexane solution containing 4 parts by mass of 1,3-butadiene and 2 parts by mass of styrene at a concentration of 25% by mass was added thereto, and the resultant was subjected to polymerization at 80° C. for 10 minutes.

Subsequently, a cyclohexane solution containing 47 parts by mass of styrene at a concentration of 25% by mass was added thereto, and the resultant was subjected to polymerization at 80° C. for 10 minutes.

Thereafter, ethanol in 1.0 equivalent relative to n-butyllithium was added in the reaction vessel to terminate polymerization completely, and 0.2 parts by mass of 2-t-butyl-6-(3-t-butyl-2-hydroxy-5-methylbenzyl)-4-methylphenyl acrylate as a heat stabilizer on the basis of 100 parts by mass of the polymer was added to obtain a cyclohexane solution containing 25% by mass of a polymer (a)-3 dissolved therein.

The polymer (a)-3 thus obtained was a block copolymer having an S1-B/S1-S2 structure with a styrene content of 96.0% by mass and a butadiene content of 4.0% by mass, and having one peak molecular weight.

<Polymer (a)-4>

In a nitrogen gas atmosphere, 0.068 parts by mass of n-butyllithium was added to a cyclohexane solution containing 46.5 parts by mass of styrene at a concentration of 25% by mass, and the resultant was subjected to polymerization at 80° C. for 5 minutes. Then, a cyclohexane solution containing 7 parts by mass of 1,3-butadiene at a concentration of 25% by mass was added thereto, and the resultant was subjected to polymerization at 80° C. for 5 minutes.

Subsequently, a cyclohexane solution containing 46.5 parts by mass of styrene at a concentration of 25% by mass was added thereto, and the resultant was subjected to polymerization at 80° C. for 10 minutes. Then, tetraglycidil-1,3-bis(aminomethyl)cyclohexane in 0.5 equivalents relative to n-butyllithium was added thereto, and the resultant was reacted at 80° C. for 5 minutes.

Thereafter, ethanol in 0.6 equivalents relative to n-butyllithium was added in the reaction vessel to terminate the polymerization completely, and 0.2 parts by mass of 2-t-butyl-6-(3-t-butyl-2-hydroxy-5-methylbenzyl)-4-methylphenyl acrylate as a heat stabilizer on the basis of 100 parts by mass of the block copolymer was added to obtain a cyclohexane solution containing 25% by mass of a polymer (a)-4 dissolved therein.

The polymer (a)-4 thus obtained was a block copolymer having combination of an S1-B1-S2 structure with a styrene content of 93% by mass and a butadiene content of 7% by mass and a (S1-B1-52)×3.5 structure formed through coupling of the S1-B1-S2 structure, and having two peak molecular weights.

<Polymer (a)-5>

In a nitrogen gas atmosphere, 0.069 parts by mass of n-butyllithium was added to a cyclohexane solution containing 45 parts by mass of styrene at a concentration of 25% by mass, and the resultant was subjected to polymerization at 80° C. for 5 minutes. Then, a cyclohexane solution containing 10 parts by mass of 1,3-butadiene at a concentration of 25% by mass was added thereto, and the resultant was subjected to polymerization at 80° C. for 5 minutes.

Subsequently, a cyclohexane solution containing 45 parts by mass of styrene at a concentration of 25% by mass was added thereto, and the resultant was subjected to polymerization at 80° C. for 10 minutes.

Thereafter, ethanol in 1.0 equivalent relative to n-butyllithium was added in the reaction vessel to terminate the polymerization completely, and 0.2 parts by mass of 2-t-butyl-6-(3-t-butyl-2-hydroxy-5-methylbenzyl)-4-methylphenyl acrylate as a heat stabilizer on the basis of 100 parts by mass of the polymer was added to obtain a cyclohexane solution containing 25% by mass of a polymer (a)-5 dissolved therein.

The polymer (a)-5 thus obtained was a block copolymer having an S1-B1-S2 structure with a styrene content of 90% by mass and a butadiene content of 10% by mass, and having one peak molecular weight.

<Polymer (a)-6>

A PSJ Polystyrene 685 available from PS Japan Corporation was used for a styrene homopolymer having a styrene content of 100% by mass.

The structures, compositions, and so on of the polymers (a)-1 to 6 are listed in the following [Table 1].

TABLE 1

| Production Example | (a)-1 | (a)-2 | (a)-3 | (a)-4 | (a)-5 | (a)-6 |
|---|---|---|---|---|---|---|
| Structure of polymer (a) | combination of (S1-B1-S2) × 3.5 and S1-B1-S2 | S1-B1-S2 | S1-B/S1-S2 | combination of (S1-B1-S2) × 3.5 and S1-B1-S2 | S1-B1-S2 | S |
| Amounts of vinyl aromatic monomer and conjugated diene monomer added (mass ratio) | combination of (49.25-1.5-49.25) × 3.5 and 49.25-1.5-49.25 | 49.25-1.5-49.25 | 47-4/2-47 | combination of (46.5-7-46.5) × 3.5 and 46.5-7-46.5 | 45-10-45 | — |
| Content of vinyl aromatic monomer (% by mass) | 98.5 | 98.5 | 96.0 | 93.0 | 90.0 | 100 |
| Content of conjugated diene monomer (% by mass) | 1.5 | 1.5 | 4.0 | 7.0 | 10.0 | 0 |
| Percentage of polymer block (S) (% by mass) | 100 | 100 | 98 | 100 | 100 | — |
| Number of molecular weight peaks | 2 | 1 | 1 | 2 | 1 | 1 |
| Peak molecular weight (10000×) | 42.0/12.0 | 12.0 | 12.5 | 41.3/11.8 | 12.4 | 27.0 |
| Remarks | — | — | — | — | — | PSJ-polystyrene (GPPS) |

(Block Copolymer (b))

<Block Copolymer (b)-1>

In a nitrogen gas atmosphere, 0.110 parts by mass of n-butyllithium and 0.0055 parts by mass of tetramethylmethylenediamine were added to a cyclohexane solution containing 17 parts by mass of styrene at a concentration of 25% by mass, and the resultant was subjected to polymerization at 80° C. for 5 minutes. Then, a cyclohexane solution containing 17 parts by mass of 1,3-butadiene and 3 parts by mass of styrene at a concentration of 25% by mass was added thereto, and the resultant was subjected to polymerization at 80° C. for 10 minutes.

Subsequently, a cyclohexane solution containing 8 parts by mass of 1,3-butadiene at a concentration of 25% by mass was added thereto, and the resultant was subjected to polymerization at 80° C. for 5 minutes.

Subsequently, a cyclohexane solution containing 35 parts by mass of 1,3-butadiene and 6 parts by mass of styrene at a concentration of 25% by mass was added thereto, and the resultant was subjected to polymerization at 80° C. for 5 minutes.

Subsequently, a cyclohexane solution containing 8 parts by mass of styrene at a concentration of 25% by mass was added thereto, and the resultant was subjected to polymerization at 80° C. for 10 minutes.

Thereafter, ethanol in 1.0 equivalent relative to n-butyllithium was added in the reaction vessel to terminate the polymerization completely, and 0.4 parts by mass of 2-t-butyl-6-(3-t-butyl-2-hydroxy-5-methylbenzyl)-4-methylphenyl acrylate as a heat stabilizer on the basis of 100 parts by mass of the polymer was added to obtain a cyclohexane solution containing 25% by mass of a block copolymer (b)-1 dissolved therein.

The block copolymer (b)-1 thus obtained was a block copolymer having an S1-B/S1-B1-B/S2-S2 structure with a styrene content of 40% by mass and a butadiene content of 60% by mass, and having one peak molecular weight.

<Block Copolymer (b)-2>

In a nitrogen gas atmosphere, 0.118 parts by mass of n-butyllithium and 0.0059 parts by mass of tetramethylmethylenediamine were added to a cyclohexane solution containing 8.5 parts by mass of styrene at a concentration of 25% by mass, and the resultant was subjected to polymerization at 80° C. for 5 minutes. Then, a cyclohexane solution containing 72 parts by mass of 1,3-butadiene and 11.5 parts by mass of styrene at a concentration of 25% by mass was added thereto, and the resultant was subjected to polymerization at 80° C. for 5 minutes.

Subsequently, a cyclohexane solution containing 8 parts by mass of styrene at a concentration of 25% by mass was added thereto, and the resultant was subjected to polymerization at 80° C. for 10 minutes.

Thereafter, ethanol in 1.0 equivalent relative to n-butyllithium was added in the reaction vessel to terminate the polymerization completely, and 0.4 parts by mass of 2-t-butyl-6-(3-t-butyl-2-hydroxy-5-methylbenzyl)-4-methylphenyl acrylate as a heat stabilizer on the basis of 100 parts by mass of the polymer was added to obtain a cyclohexane solution containing 25% by mass of a block copolymer (b)-2 dissolved therein.

The block copolymer (b)-2 thus obtained was a block copolymer having an S1-B/S1-S2 structure with a styrene content of 28% by mass and a butadiene content of 72% by mass, and having one peak molecular weight.

<Block Copolymer (b)-3>

In a nitrogen gas atmosphere, 0.112 parts by mass of n-butyllithium and 0.0056 parts by mass of tetramethylmethylenediamine were added to a cyclohexane solution containing 10.7 parts by mass of styrene at a concentration of 25% by mass, and the resultant was subjected to polymerization at 80° C. for 5 minutes. Then, a cyclohexane solution containing 70 parts by mass of 1,3-butadiene and 10.5 parts by mass of styrene at a concentration of 25% by mass was added thereto, and the resultant was subjected to polymerization at 80° C. for 5 minutes.

Subsequently, a cyclohexane solution containing 8.8 parts by mass of styrene at a concentration of 25% by mass was added thereto, and the resultant was subjected to polymerization at 80° C. for 10 minutes.

Thereafter, ethanol in 1.0 equivalent relative to n-butyllithium was added in the reaction vessel to terminate the polymerization completely, and 0.4 parts by mass of 2-t-butyl-6-(3-t-butyl-2-hydroxy-5-methylbenzyl)-4-methylphenyl acrylate as a heat stabilizer on the basis of 100 parts by mass of the polymer was added to obtain a cyclohexane solution containing 25% by mass of a block copolymer (b)-3 dissolved therein.

The block copolymer (b)-3 thus obtained was a block copolymer having an S1-B/S1-S2 structure with a styrene content of 30% by mass and a butadiene content of 70% by mass, and having one peak molecular weight.

<Block Copolymer (b)-4>

In a nitrogen gas atmosphere, 0.117 parts by mass of n-butyllithium and 0.0059 parts by mass of tetramethylmethylenediamine were added to a cyclohexane solution containing 2 parts by mass of styrene at a concentration of 25% by mass, and the resultant was subjected to polymerization at 80° C. for 5 minutes. Then, a cyclohexane solution containing 90 parts by mass of 1,3-butadiene and 5 parts by mass of styrene at a concentration of 25% by mass was added thereto, and the resultant was subjected to polymerization at 80° C. for 5 minutes.

Subsequently, a cyclohexane solution containing 3 parts by mass of styrene at a concentration of 25% by mass was added thereto, and the resultant was subjected to polymerization at 80° C. for 10 minutes Thereafter, ethanol in 1.0 equivalent relative to n-butyllithium was added in the reaction vessel to terminate the polymerization completely, and 0.4 parts by mass of 2-t-butyl-6-(3-t-butyl-2-hydroxy-5-methylbenzyl)-4-methylphenyl acrylate as a heat stabilizer on the basis of 100 parts by mass of the polymer was added to obtain a cyclohexane solution containing 25% by mass of a block copolymer (b)-4 dissolved therein.

The block copolymer (b)-4 thus obtained was a block copolymer having an S1-B/S1-S2 structure with a styrene content of 10% by mass and a butadiene content of 90% by mass, and having one peak molecular weight.

<Block Copolymer (b)-5>

In a nitrogen gas atmosphere, 0.116 parts by mass of n-butyllithium was added to a cyclohexane solution containing 19 parts by mass of styrene at a concentration of 25% by mass, and the resultant was subjected to polymerization at 80° C. for 5 minutes. Then, a cyclohexane solution containing 61 parts by mass of 1,3-butadiene at a concentration of 25% by mass was added thereto, and the resultant was subjected to polymerization at 80° C. for 5 minutes.

Subsequently, a cyclohexane solution containing 20 parts by mass of styrene at a concentration of 25% by mass was added thereto, and the resultant was subjected to polymerization at 80° C. for 10 minutes Thereafter, ethanol in 1.0 equivalent relative to n-butyllithium was added in the reaction vessel to terminate the polymerization completely, and 0.4 parts by mass of 2-t-butyl-6-(3-t-butyl-2-hydroxy-5-methylbenzyl)-4-methylphenyl acrylate as a heat stabilizer on the basis of 100 parts by mass of the polymer was added to obtain a cyclohexane solution containing 25% by mass of a block copolymer (b)-5 dissolved therein.

The block copolymer (b)-5 thus obtained was a block copolymer having an S1-B1-S2 structure with a styrene content of 39% by mass and a butadiene content of 61% by mass, and having one peak molecular weight.

<Block Copolymer (b)-6>

In a nitrogen gas atmosphere, 0.006 parts by mass of tetramethylethylenediamine and 0.120 parts by mass of n-butyllithium were added to a cyclohexane solution containing 10 parts by mass of styrene at a concentration of 25% by mass, and the resultant was subjected to polymerization at 80° C. for 5 minutes. Then, a cyclohexane solution containing 60 parts by mass of 1,3-butadiene and 30 parts by mass of styrene at a concentration of 25% by mass was added thereto, and the resultant was subjected to polymerization at 80° C. for 10 minutes.

Subsequently, 1 equivalent of tetraglycidyl-1,3-bis(aminomethyl)cyclohexane was added thereto, and reacted at 80° C. for 5 minutes.

Thereafter, ethanol in 0.5 equivalent relative to n-butyllithium was added in the reaction vessel to terminate the polymerization completely, and 0.4 parts by mass of 2-t-butyl-6-(3-t-butyl-2-hydroxy-5-methylbenzyl)-4-methylphenyl acrylate as a heat stabilizer on the basis of 100 parts by mass of the polymer was added to obtain a cyclohexane solution containing 25% by mass of a block copolymer (b)-6 dissolved therein.

The block copolymer (b)-6 thus obtained was a block copolymer having combination of an S1-B/S1 structure with a styrene content of 40% by mass and a butadiene content of 60% by mass and a (S1-B/S1)×3 structure formed through coupling of the S1-B/S1 structure, and having two peak molecular weights.

The structures, compositions, and so on of the block copolymer (b)-1 to 6 are listed in the following [Table 2].

TABLE 2

| Production Example | (b)-1 | (b)-2 | (b)-3 | (b)-4 | (b)-5 | (b)-6 |
| --- | --- | --- | --- | --- | --- | --- |
| Structure of block copolymer (b) | S1-B/S1-B1-B/S2-S2 | S1-B/S1-S2 | S1-B/S1-S2 | S1-B/S1-S2 | S1-B1-S2 | combination of (S1-B/S1) × 3 and S1-B/S1 |
| Amounts of vinyl aromatic monomer and conjugated diene monomer added (mass ratio) | 17-17/3-8-35/6-14 | 8.5-72/11.5-8 | 10.7-70/10.5-8.8 | 2-95/5-3 | 19-61-20 | combination of (10-60/30) × 3 and 10-60/30 |
| Content of vinyl aromatic monomer (% by mass) | 40 | 28 | 30 | 10 | 39 | 40 |

TABLE 2-continued

| Production Example | (b)-1 | (b)-2 | (b)-3 | (b)-4 | (b)-5 | (b)-6 |
|---|---|---|---|---|---|---|
| Content of conjugated diene monomer (% by mass) | 60 | 72 | 70 | 90 | 61 | 60 |
| Percentage of polymer block (S) (% by mass) | 77 | 59 | 65 | 50 | 100 | 25 |
| Number of molecular weight peaks | 1 | 1 | 1 | 1 | 1 | 2 |
| Peak molecular weight (10000×) | 6.5 | 6.5 | 6.5 | 9.3 | 5.3 | 14.6/4.9 |

(Rubber-Modified Vinyl Aromatic Polymer (c))

An impact-resistant polystyrene as a polymer of polystyrene modified with polybutadiene rubber was selected as a rubber-modified vinyl aromatic polymer (c), for which a PSJ-Polystyrene 475D manufactured by PS Japan Corporation was used.

The melt flow rate was 2.0 g/10 min.

(Vinyl Aromatic-Based Polymer (d))

<Vinyl Aromatic-Based Polymer (d)-1>

A PSJ-Polystyrene 685 manufactured by PS Japan Corporation as a polystyrene of styrene homopolymer was used for a vinyl aromatic-based polymer (d)-1.

The melt flow rate was 2.1 g/10 min.

<Vinyl Aromatic-Based Polymer (d)-2>

OPS (oriented polystyrene) wastes in fragments generated in a processing plant for manufacturing top covers for OPS lunchboxes to be sold in a grocery store or convenience store were recovered and ground, and the resultant was used for a vinyl aromatic-based polymer (d)-2, as a starting material in Examples.

The melt flow rate was 2.8 g/10 min.

[Production of Block Copolymer Compositions]

Block copolymer compositions were produced by using one of two methods, i.e., solution blending or melt-kneading blending.

In the case of solution blending, a cyclohexane solution containing 25% by mass of each of the polymers (a)-1 to 5 and a cyclohexane solution containing 25% by mass of each of the block copolymers (b)-1 to 5 were subjected to solution blending at a predetermined ratio, followed by desolventizing through heating and vacuum decompression, and the resultant was converted into a molded material in spherical pellets having an average particle diameter of 2.5 mm by using an extruder.

For Comparative Examples 4 to 6, each of the polymer (a) and the block copolymer (b) was individually subjected to desolventizing without performing solution blending, and was individually finished into a molded material in similar pellets.

By using a gas chromatograph, it was confirmed that each of the molded materials in pellets had a residual cyclohexane content of less than 0.3% by mass.

In the case of production of a block copolymer composition through melt-kneading blending, the above molded materials prepared by individually finishing the polymer (a) and the block copolymer (b) into pellets, and the PSJ-Polystyrene 685 in Production Example (a)-6 were subjected to melt-kneading blending.

In melt-kneading, the polymer (a) and the block copolymer (b) were subjected to heat-melt blending by using a single-screw extruder with a screw diameter of 40 mm and L/D=28 at a cylinder temperature of 210° C., and the resultant was finished into a molded material in cylindrical pellets having average lengths of 3 mm in the major axis and 2 mm in the minor axis through strand cutting.

The compositions, blending ratios, and blending methods for the block copolymer compositions are listed in [Table 3] below.

[Methods for Measuring Analytical Values]

The analytical values derived from the composition and structure of each of the polymers (a) listed in the above [Table 1], block copolymers (b) listed in the above [Table 2], and block copolymer compositions listed in [Table 3] below were measured in accordance with the following methods.

((1) Content of Vinyl Aromatic Monomer (Styrene))

The content of the vinyl aromatic monomer was measured with a UV meter (ultraviolet ray absorptiometer).

Specifically, in the case that a polymer (a), block copolymer (b), or block copolymer composition, as a subject of measurement, was solid, it was directly used for analysis.

In the case of a polymer solution with a subject of measurement dissolved in cyclohexane or the like, about 1 mL of the polymer solution was taken and dropped on an aluminum foil, and dried in air flow under a fume hood to remove the solvent to a certain degree, and then further dried in an explosion-proof vacuum dryer at 80° C. under reduced pressure for 2 hours to obtain a solid polymer.

Subsequently, about 30 mg (accurately weighed to an order of 0.1 mg) of the polymer as a subject of measurement was dissolved in 100 mL of chloroform; a quartz cell filled with the polymer solution was set in an analyzer; the cell was scanned with a ultraviolet ray having a wavelength of 260 to 290 nm to obtain an absorption peak; and the content of the vinyl aromatic monomer was determined from the height of the absorption peak by using a calibration curve method.

In the case that the vinyl aromatic monomer was styrene, a peak wavelength appeared at 269.2 nm.

((2) Content of Conjugated Diene Monomer (Butadiene))

The content of the conjugated diene monomer (butadiene) in a polymer (a), block copolymer (b), or block copolymer composition was calculated by subtracting the above-obtained content in % by mass of the vinyl aromatic monomer unit from 100% by mass.

((3) Method for Quantifying Total Content (% by Mass) of Dimer and Trimer of Vinyl Aromatic Monomer (Styrene))

About 2 g of a block copolymer composition as a subject of measurement was taken, and accurately weighed to an order of 0.1 mg.

The block copolymer composition was dissolved in 20 mL of methyl ethyl ketone accurately diluted in a measuring cylinder, and then 5 mL of a methanol solution of triphenylmethane, as a standard material, having a known concentration was further added thereto.

The measurement conditions were as follows.

Apparatus: gas chromatograph GC-17Apf, manufactured by Shimadzu Corporation

Column: DB-1 (100% dimethylpolysiloxane) 30 m, 0.1 μm film thickness, 0.25 mmϕ

Column temperature: retention at 100° C. for 2 minutes→temperature elevation at 5° C./min to 260° C.→retention at 260° C. for 5 minutes Inlet temperature: 200° C.

Detector temperature: 200° C.

Carrier gas: nitrogen

In the case that the vinyl aromatic monomer was styrene, the peak derived from triphenylmethane, the internal standard material, appeared in a retention time between the peaks for the dimer and trimer of styrene.

The concentrations of the dimer and trimer of the vinyl aromatic monomer were calculated by determining the peak areas on the basis of the concentration of the internal standard material.

((4) Haze)

Haze is also called haze value.

The test standard is defined in ISO 14782.

Each block copolymer composition was molded into a test piece having a thickness of 2 mm by using an injection molding method, and the test piece was used for haze measurement.

A test piece of a mirror-surface plate having a long-side length of 90 mm, a short-side length of 50 mm, and a thickness of 2 mm was formed through injection molding by using an injection molding machine (model: FE120) manufactured by NISSEI PLASTIC INDUSTRIAL CO., LTD. at a cylinder temperature of 210° C. and a mold temperature of 40° C., and the test piece was left to stand in an environment of 23° C. for 24 hours, and thereafter the haze was measured with the haze computer HZ-1 manufactured by Suga Test Instruments Co., Ltd. in accordance with the test standard ISO 14782.

Although ISO 14782 recites "This method is applicable to the measurement of haze values of less than 40%", this method was applied even to measurement of haze values of more than 40% in Examples.

((5) Measurement of Peak Molecular Weight and Number of Molecular Weight Peaks Through GPC)

The peak molecular weight and the number of molecular weight peaks of a block copolymer composition, polymer (a), or block copolymer (b) were measured with a gel permeation chromatography (GPC) apparatus under the following measurement conditions.

GPC apparatus: HLC-8220 manufactured by Tosoh Corporation

Column: two SuperMultiporeHZ-M connected in series, manufactured by Tosoh Corporation Column temperature: 35° C.

Solvent: tetrahydrofuran

Feeding rate: 0.2 mL/min

Detector: refractometer (RI)

In tetrahydrofuran as a solvent, 50 mg of a polymer to be measured for molecular weight was completely dissolved with a shaker or the like, and an insoluble matter such as a gel was removed through filtration with a disc filter manufactured by KURABO INDUSTRIES LTD. to obtain a measurement sample for GPC.

The measurement method is specifically as follows.

First, a calibration curve was prepared by using 9 standard monodispersed polystyrenes for GPC having different known molecular weights.

The highest weight average molecular weight Mw among the standard polystyrenes used was 1090000, and the lowest weight average molecular weight Mw among them was 1050.

A measurement sample was prepared with a polymer (a) or block copolymer (b) to be measured for molecular weight, in the manner as described above.

After confirming that the temperature in a chamber containing columns became constant, a solution sample was injected to initiate the measurement.

After the measurement, the molecular weight distribution curve obtained was statistically processed, and the weight average molecular weight Mw and the number average molecular weight Mn were calculated.

The molecular weight distribution was obtained by dividing the weight average molecular weight Mw by the number average molecular weight Mn. The number of molecular weight peaks was determined from the shape of the molecular weight distribution curve.

((6) Percentage of Polymer Block (S))

"Percentage of polymer block (S)" is the percentage (% by mass) of the vinyl aromatic monomer unit included in a polymer block (S) of a polymer (a) or block copolymer (b).

The measurement procedure is as follows.

First, the total vinyl aromatic monomer (styrene) content in the polymer was calculated with a UV meter as described above.

Then, the content of styrene included in the polymer block (S) was determined. Specifically, about 50 mg of a polymer accurately weighed was dissolved in about 10 mL of chloroform, and an osmic acid solution was then added thereto to decompose the conjugated diene monomer unit portion, and the polymer solution after the decomposition was gently added dropwise into about 200 mL of methanol. This allowed a polymer block styrene component insoluble in methanol to precipitate. The precipitated component is the polymer block (S), and a styrene monomer which was not forming the polymer block (S) and styrene having a low degree of polymerization were dissolved in a methanol/chloroform mixed solution. The precipitated polymer was collected through filtration, and dried in vacuum, and the amount of the polymer block (S) was determined by weighing the polymer block (S) as the residue.

For the proportion of the vinyl monomer included in the polymer block (S), a value obtained by dividing the amount of block styrene by the total amount of styrene was used.

((7) Temperature at Tan δ Peak of Dynamic Viscoelasticity)

A strip having width of 5 mm, a length of 50 mm, and a thickness of 2 mm was prepared as a test piece for dynamic viscoelasticity measurement by using compression molding.

The dynamic viscoelasticity of the test piece was measured with a rheospectorer DVE-V4FT manufactured by Rheology Co., Ltd. in a tensile mode at a frequency of 35 Hz and a temperature elevation rate of 3° C./min, in a temperature range from −110° C. to a normal temperature such that a temperature at a tan δ peak could be found.

For cooling, liquid nitrogen was used.

In measurement for a resin composition or a molded product, a test piece was prepared as follows.

About 10 g of a resin composition or molded product was taken in a beaker, and 200 mL of toluene was poured therein and stirred for dissolving the resin composition or molded product at the room temperature. After the resin composition or molded product was completely dissolved, the solution was transferred into a centrifuge tube, and subjected to centrifugation with a centrifuge at 20000 rpm for 30 minutes while the solution was cooled to 10° C. or less.

After the centrifugation, grafted rubber particles derived from the rubber-modified vinyl aromatic polymer (c) precipitated, and thus were separated from a soluble fraction.

The soluble fraction was dropped on an aluminum foil, and dried in air flow under a fume hood to remove toluene as the solvent to a certain degree, and then further dried in an explosion-proof vacuum dryer at 80° C. under reduced pressure for 2 hours to obtain a solid polymer. The solid polymer obtained was compression molded into a strip-shaped test piece having a width of 5 mm, a length of 50 mm, and a thickness of 2 mm by using pressing, and measurement was performed under the above conditions.

((8) Melt Flow Rate of Block Copolymer Composition)

For measurement of the melt flow rate of a block copolymer composition, the melt flow rate of a block copolymer composition in pellets was measured at a temperature of 200° C. and a load of 5 kgf in accordance with ISO 1133.

[Sheet Molding with Resin Composition]

Extrusion molding was performed for each of the resin compositions in Examples and Comparative Examples to form a small labsheet.

For sheet molding, a sheet extrusion molding machine (single-screw, with Dulmage kneading, screw diameter: 40 mm, L/D=36, T-die width: 400 mm, mirror-finished roll) manufactured by Ikegai Corp. was used at a cylinder temperature of 210° C. and a roll temperature of 60° C. to prepare a sheet having a thickness of 0.4 mm (1.0 mm only for molding of a container for evaluation of crack resistance).

A portion about 30 mm from each edge was trimmed off, and thus an original sheet having a width of 250 mm was obtained.

[Observation with Transmission Electron Microscope (TEM Image)]

For observation of a TEM image, a sheet having a thickness of 2 mm was prepared with a block copolymer composition heated to 200° C., and the sheet of a block copolymer composition was impregnated with a 5% aqueous solution of osmic acid at normal temperature for 24 hours for staining. The block copolymer composition stained was sufficiently dried through removal of moisture, and then cut with a cryomicrotome while being frozen with liquid nitrogen to prepare an ultrathin section having a thickness of about 70 nm, which was observed with a transmission electron microscope.

The conjugated diene monomer unit portion, which is highly reactive with osmic acid, was observed as a blackish, dark-colored part.

FIG. 1 shows a TEM image of [Example 4] described later.

In FIG. 1, a light-colored part forming a dispersed phase having a size of about 0.5 μm or less corresponds to a polymer (a), and a dark-colored part forming a continuous phase corresponds to a block polymer (b).

[Characteristics of Resin Compositions]

<Impact Resistance (Impact Strength)>

The dart impact value was applied as an indicator of impact resistance, and the impact strength was measured with an IFW impact tester (Instrumented Falling Weight Impact Tester; manufactured by ROSAND PRECISION Ltd.) in accordance with ISO 7765-1: 1988.

Used was a hemispherical falling weight the striking face of which had a diameter of 38.0 mm.

The unit used was J.

<Tensile Modulus, TD/MD Ratio, Tensile Breaking Elongation in Tensile Test>

A sheet was formed in accordance with [Sheet molding with resin composition] described above, and the original sheet was then cured in a thermostatic chamber at 23° C. and a humidity of 50% for 24 hours.

After curing, a JIS No. 1 dumbbell according to JIS K7113 was stamped out of the original sheet having a thickness of 0.4 mm obtained in the above sheet molding with a Super Dumbbell Cutter manufactured by DUMB-BELL CO., LTD. to prepare a tensile test piece.

A tensile test was carried out in the same temperature/humidity environment with a TG-5 kN manufactured by Minebea Co., Ltd.

A dumbbell stamped out in parallel with the direction of sheet extrusion was defined as a dumbbell in the MD, and a dumbbell stamped out perpendicularly to the direction of sheet extrusion was defined as a dumbbell in the TD.

A chuck was set to clamp a load cell and a dumbbell, and measurement was performed for each of dumbbells in the MD and TD with a chuck-to-chuck distance of 115 mm and a tensile speed of 50 mm/min for n=5 to calculate the average value, which was used as a measurement result.

In a stress-strain curve obtained in the tensile test, the tangent line at an initial rise of the stress corresponding to a minute strain in the initial stage of pulling was defined as the tensile modulus, and the ratio of the tensile modulus in the TD to that in the MD was determined. The ratio becomes closer to 1 as the value of tensile modulus in the MD becomes closer to that in the TD, which indicates higher isotropy. As the anisotropy becomes higher, on the other hand, the difference between the value of tensile modulus in the MD and that in the TD is widened and the ratio deviates from 1.

$$\text{Isotropy} = (\text{tensile modulus in } TD)/(\text{tensile modulus in } MD)$$

In addition, for the MD, application of a strain was continued until breaking, and the strain at breaking was measured. The tensile breaking elongation was determined on the basis of the chuck-to-chuck distance (unit: mm) at breaking.

$$\text{Tensile breaking elongation} = (\text{chuck-to-chuck distance at breaking} - 115)/115 (\text{unit: \%})$$

In the case of a sheet only with the rubber-modified vinyl aromatic polymer (c), a sheet for which the impact resistance value described above was 0.73 J or more, the average value of tensile modulus in the MD and that in the TD was 2000 MPa or more, and the tensile modulus in the TD was 1800 or more was determined to be sufficiently effective in practical use; and in the case of a sheet with the rubber-modified vinyl aromatic polymer (c) and a vinyl aromatic-based polymer (d) in combination, a sheet for which the impact resistance value described above was 0.72 J or more and the average value of tensile modulus in the MD and that in the TD was 1700 MPa or more was determined to be sufficiently effective in practical use.

<Heat-Aging Resistance>

A JIS No. 1 dumbbell stamped out in the MD as described in the above <Tensile modulus, TD/MD ratio, tensile breaking elongation in tensile test> was heated in a gear oven set at 100° C. for 72 hours.

After the elapse of 72 hours, the dumbbell was taken out of the oven, and cured in a thermostatic chamber kept at 23° C. and a humidity of 50% for 24 hours, and then subjected to a tensile test by using the above-described method. The value of tensile modulus and the value of tensile breaking elongation, each described in the above, were compared with those measured without heating, and each change rate was calculated by using the following equation.

Change rate after heat-aging resistance test [%]= [(numerical value for sample without heating− numerical value for sample with heating)/(numerical value for sample without heating)]

<Crack Resistance>

For evaluation of crack resistance, an original sheet having a thickness of 1 mm was prepared by using sheet extrusion molding in [Sheet molding with resin composition] described above.

In addition, a container with a deep-drawn shape was formed by using vacuum forming, where the periphery portion at the top had a size of 180 mm×130 mm and the bottom had a size of 160 mm×110 mm and the depth was 25 mm.

Forming conditions were set so that the thickness of the periphery in the lowermost part of the container reached 0.6 mm.

The container was turned upside down into a state in which the periphery of the container was positioned at the lowermost part, in other words, a state in which the opening of the container was positioned in the lower side and the bottom was positioned in the upper side, and a corner in the bottom of the container was pushed with a jig for the ISO flexural test at a constant speed of 10 mm/min to test until buckling distortion occurred, at which reduction of stress was found after the maximum stress was reached.

The measurement was performed 15 times, and the number of cases that no crack found in the peripheral part of the container before buckling was counted, and evaluated by using the following criteria.

12 or more cases: ◎
10 or 11 cases: ○
9 or less cases: x

Examples 1 to 14, Comparative Examples 1 to 6

The polymers (a) listed in the above [Table 1] and the block copolymers (b) listed in the above [Table 2] were appropriately combined and blended in advance to obtain block copolymer compositions listed in [Table 3] below.

Blending was performed through either "melt-kneading blending" or "solution blending".

In Comparative Examples 4 to 6, a polymer (a) and a block copolymer (b) were not blended together, and each of them was individually subjected to desolventizing to finish into pellets.

In Examples 13 and 14, melt-kneading blending was performed for the pellets individually finished as described for Comparative Example 4 or 5 and a PSJ-Polystyrene 685 at a blending ratio listed in [Table 3] below by using a 40 mm single-screw extruder at a cylinder temperature of 210° C., and thus a molded material in pellets comprising a block copolymer composition was obtained.

In Example 4 and Example 14, identical polymers and an identical composition ratio were used, and only the blending method was different between Example 4 and Example 14.

TABLE 3

|  |  | Polymer (a) | Block copolymer (b) | Blending method | Total content of dimer and trimer ppm | Haze % | Peak molecular weight in GPC (10000×) | tan δ ° C. | Melt flow rate g/10 min |
|---|---|---|---|---|---|---|---|---|---|
| Example 1 | Polymer species | (a)-1 | (b)-1 | solution | 280 | 93 | 42.0/12.0/6.5 | −58 | 7.6 |
|  | Blending ratio (% by mass) | 70 | 30 |  |  |  |  |  |  |
| Example 2 | Polymer species | (a)-1 | (b)-1 | solution | 270 | 92 | 42.0/12.0/6.5 | −58 | 8.1 |
|  | Blending ratio (% by mass) | 65 | 35 |  |  |  |  |  |  |
| Example 3 | Polymer species | (a)-1 | (b)-1 | solution | 250 | 91 | 42.0/12.0/6.5 | −58 | 8.7 |
|  | Blending ratio (% by mass) | 60 | 40 |  |  |  |  |  |  |
| Example 4 | Polymer species | (a)-1 | (b)-1 | solution | 230 | 90 | 42.0/12.0/6.5 | −58 | 10 |
|  | Blending ratio (% by mass) | 50 | 50 |  |  |  |  |  |  |
| Example 5 | Polymer species | (a)-1 | (b)-1 | solution | 210 | 72 | 42.0/12.0/6.5 | −58 | 12 |
|  | Blending ratio (% by mass) | 35 | 65 |  |  |  |  |  |  |
| Example 6 | Polymer species | (a)-2 | (b)-1 | solution | 230 | 90 | 12.0/6.5 | −58 | 14 |
|  | Blending ratio (% by mass) | 50 | 50 |  |  |  |  |  |  |
| Example 7 | Polymer species | (a)-3 | (b)-1 | solution | 220 | 86 | 12.5/6.5 | −58 | 14 |
|  | Blending ratio (% by mass) | 50 | 50 |  |  |  |  |  |  |
| Comparative Example 1 | Polymer species | (a)-4 | (b)-1 | solution | 240 | 63 | 12.4/6.5 | −58 | 9.1 |
|  | Blending ratio (% by mass) | 60 | 40 |  |  |  |  |  |  |
| Comparative Example 2 | Polymer species | (a)-5 | (b)-1 | solution | 210 | 55 | 12.4/6.5 | −58 | 16 |
|  | Blending ratio (% by mass) | 50 | 50 |  |  |  |  |  |  |
| Example 8 | Polymer species | (a)-1 | (b)-2 | solution | 240 | 93 | 42.0/12.0/6.5 | −55 | 9.3 |
|  | Blending ratio (% by mass) | 60 | 40 |  |  |  |  |  |  |
| Example 9 | Polymer species | (a)-1 | (b)-2 | solution | 220 | 92 | 42.0/12.0/6.5 | −55 | 11 |
|  | Blending ratio (% by mass) | 50 | 50 |  |  |  |  |  |  |
| Example 10 | Polymer species | (a)-1 | (b)-3 | solution | 230 | 92 | 42.0/12.0/6.5 | −56 | 11 |
|  | Blending ratio (% by mass) | 50 | 50 |  |  |  |  |  |  |
| Comparative Example 3 | Polymer species | (a)-1 | (b)-4 | solution | 190 | 92 | 42.0/12.0/9.3 | −73 | 12 |
|  | Blending ratio (% by mass) | 60 | 40 |  |  |  |  |  |  |
| Example 11 | Polymer species | (a)-1 | (b)-5 | solution | 240 | 92 | 42.0/12.0/0.93 | −78 | 9.5 |
|  | Blending ratio (% by mass) | 50 | 50 |  |  |  |  |  |  |
| Example 12 | Polymer species | (a)-1 | (b)-6 | solution | 210 | 90 | 42.0/14.6/12.0/4.9 | −40 | 6.2 |
|  | Blending ratio (% by mass) | 60 | 40 |  |  |  |  |  |  |
| Comparative Example 4 | Polymer species | (a)-1 | — | individually finished | 400 | 0.5 | 42.0/12.0 | no peak in low temperature region | 5.0 |
|  | Blending ratio (% by mass) | 100 | — |  |  |  |  |  |  |
| Comparative Example 5 | Polymer species | — | (b)-1 | individually finished | 90 | 2.0 | 6.5 | −58 | 16 |
|  | Blending ratio (% by mass) | — | 100 |  |  |  |  |  |  |

TABLE 3-continued

|  |  | Polymer (a) | Block copolymer (b) | Blending method | Total content of dimer and trimer ppm | Haze % | Peak molecular weight in GPC (10000×) | tan δ ° C. | Melt flow rate g/10 min |
|---|---|---|---|---|---|---|---|---|---|
| Comparative Example 6 | Polymer species | — | (b)-5 | individually finished | 95 | 3.0 | 5.3 | −78 | 20 |
|  | Blending ratio (% by mass) | — | 100 |  |  |  |  |  |  |
| Example 13 | Polymer species | (a)-6 | (b)-1 | melt | 4500 | 91 | 27/6.5 | −58 | 6.5 |
|  | Blending ratio (% by mass) | 50 | 50 |  |  |  |  |  |  |
| Example 14 | Polymer species | (a)-1 | (b)-1 | melt | 300 | 90 | 42.0/12.0/6.5 | −58 | 11 |
|  | Blending ratio (% by mass) | 50 | 50 |  |  |  |  |  |  |

Examples 15 to 32, Comparative Examples 7 to 14

Each of the molded materials comprising various block copolymer compositions listed in the above [Table 3] was combined with the rubber-modified vinyl aromatic polymer (c), and pellets of them were dry-blended at a blending ratio listed in [Table 4] below, for which sheet molding through T-die extrusion was performed to prepare a sheet having a thickness of 0.4 mm.

In Comparative Examples 10 to 14, a molded material comprising a polymer (a) and a block copolymer (b) each as an independent polymer (i.e., without use of a block copolymer composition comprising a polymer (a) and a block copolymer (b)) was similarly combined with the rubber-modified vinyl aromatic polymer (c), and pellets of them were dry-blended at a blending ratio listed in [Table 5] below, for which sheet molding through T-die extrusion was performed to obtain a sheet having a thickness of 0.4 mm and a sheet having a thickness of 1.0 mm.

The resin composition sheets obtained were used for the above-described characterizations.

A container was formed from the sheet having a thickness of 1.0 mm through vacuum forming, and the crack resistance was evaluated.

The blending compositions and evaluation results are listed in [Table 4] and [Table 5] below.

The results of evaluation for each molded material comprising a polymer (a) and a block copolymer (b) each as an independent polymer are summarized in [Table 5] below.

TABLE 4

|  |  | Block copolymer composition | Rubber-modified vinyl aromatic polymer (c) | Tensile modulus | | Isotropy (TD/MD) | Impact strength Dart impact value (J) | Change rate after heat-aging resistance test | | Crack resistance |
|---|---|---|---|---|---|---|---|---|---|---|
|  |  |  |  | MD (MPa) | TD (MPa) |  |  | Tensile modulus (%) | Tensile breaking elongation (%) |  |
| Example 15 | Polymer species | Example 1 | (c)-1 | 2300 | 1990 | 0.86 | 0.92 | 6 | 17 | ◎ |
|  | Blending ratio (% by mass) | 20 | 80 |  |  |  |  |  |  |  |
| Example 16 | Polymer species | Example 2 | (c)-1 | 2500 | 2340 | 0.94 | 0.75 | 5 | 14 | ◎ |
|  | Blending ratio (% by mass) | 10 | 90 |  |  |  |  |  |  |  |
| Example 17 | Polymer species | Example 3 | (c)-1 | 2650 | 2544 | 0.96 | 0.73 | 2 | 2 | ○ |
|  | Blending ratio (% by mass) | 2 | 98 |  |  |  |  |  |  |  |
| Example 18 | Polymer species | Example 4 | (c)-1 | 2600 | 2496 | 0.96 | 0.73 | 2 | 2 | ○ |
|  | Blending ratio (% by mass) | 2 | 98 |  |  |  |  |  |  |  |
| Example 19 | Polymer species | Example 3 | (c)-1 | 2520 | 2369 | 0.94 | 0.74 | 4 | 13 | ◎ |
|  | Blending ratio (% by mass) | 7 | 93 |  |  |  |  |  |  |  |
| Example 20 | Polymer species | Example 4 | (c)-1 | 2488 | 2317 | 0.93 | 0.75 | 4 | 13 | ◎ |
|  | Blending ratio (% by mass) | 7 | 93 |  |  |  |  |  |  |  |
| Example 21 | Polymer species | Example 3 | (c)-1 | 2395 | 1988 | 0.83 | 0.76 | 4 | 13 | ◎ |
|  | Blending ratio (% by mass) | 10 | 90 |  |  |  |  |  |  |  |
| Example 22 | Polymer species | Example 4 | (c)-1 | 2250 | 1890 | 0.84 | 0.95 | 7 | 18 | ◎ |
|  | Blending ratio (% by mass) | 16 | 84 |  |  |  |  |  |  |  |
| Example 23 | Polymer species | Example 5 | (c)-1 | 2240 | 1910 | 0.85 | 0.90 | 6 | 18 | ◎ |
|  | Blending ratio (% by mass) | 10 | 90 |  |  |  |  |  |  |  |
| Example 24 | Polymer species | Example 6 | (c)-1 | 2250 | 1880 | 0.84 | 0.89 | 8 | 19 | ◎ |
|  | Blending ratio (% by mass) | 16 | 84 |  |  |  |  |  |  |  |
| Example 25 | Polymer species | Example 7 | (c)-1 | 2220 | 1840 | 0.83 | 0.95 | 9 | 20 | ◎ |
|  | Blending ratio (% by mass) | 16 | 84 |  |  |  |  |  |  |  |
| Example 26 | Polymer species | Example 8 | (c)-1 | 2253 | 1938 | 0.86 | 0.74 | 6 | 17 | ◎ |
|  | Blending ratio (% by mass) | 10 | 90 |  |  |  |  |  |  |  |
| Example 27 | Polymer species | Example 9 | (c)-1 | 2220 | 1890 | 0.85 | 0.77 | 7 | 18 | ◎ |
|  | Blending ratio (% by mass) | 10 | 90 |  |  |  |  |  |  |  |
| Example 28 | Polymer species | Example 10 | (c)-1 | 2240 | 1910 | 0.85 | 0.79 | 6 | 17 | ◎ |
|  | Blending ratio (% by mass) | 10 | 90 |  |  |  |  |  |  |  |
| Example 29 | Polymer species | Example 11 | (c)-1 | 2300 | 1940 | 0.84 | 0.88 | 9 | 20 | ○ |
|  | Blending ratio (% by mass) | 16 | 84 |  |  |  |  |  |  |  |
| Example 30 | Polymer species | Example 12 | (c)-1 | 2200 | 1850 | 0.84 | 0.90 | 6 | 16 | ◎ |
|  | Blending ratio (% by mass) | 16 | 84 |  |  |  |  |  |  |  |

TABLE 4-continued

|  |  | Block copolymer composition | Rubber-modified vinyl aromatic polymer (c) | Tensile modulus MD (MPa) | Tensile modulus TD (MPa) | Isotropy (TD/MD) | Impact strength Dart impact value (J) | Change rate after heat-aging resistance test Tensile modulus (%) | Change rate after heat-aging resistance test Tensile breaking elongation (%) | Crack resistance |
|---|---|---|---|---|---|---|---|---|---|---|
| Example 31 | Polymer species | Example 13 | (c)-1 | 2260 | 1900 | 0.84 | 0.81 | 9 | 20 | ○ |
|  | Blending ratio (% by mass) | 16 | 84 |  |  |  |  |  |  |  |
| Example 32 | Polymer species | Example 14 | (c)-1 | 2250 | 1890 | 0.84 | 0.88 | 10 | 21 | ◎ |
|  | Blending ratio (% by mass) | 16 | 84 |  |  |  |  |  |  |  |
| Comparative Example 7 | Polymer species | Comparative Example 1 | (c)-1 | 2060 | 1545 | 0.75 | 0.79 | 10 | 22 | X |
|  | Blending ratio (% by mass) | 10 | 90 |  |  |  |  |  |  |  |
| Comparative Example 8 | Polymer species | Comparative Example 2 | (c)-1 | 1980 | 1470 | 0.74 | 0.80 | 12 | 24 | X |
|  | Blending ratio (% by mass) | 10 | 90 |  |  |  |  |  |  |  |
| Comparative Example 9 | Polymer species | Comparative Example 3 | (c)-1 | — | — | — | — | — | — | — |
|  | Blending ratio (% by mass) | 10 | 90 |  |  |  |  |  |  |  |

TABLE 5

|  |  | Polymer (a) | Block copolymer (b) | Rubber-modified vinyl aromatic polymer (c) | Tensile modulus MD (MPa) | Tensile modulus TD (MPa) | Isotropy (TD/MD) | Impact strength Dart impact value (J) | Change rate after heat-aging resistance test Tensile modulus (%) | Change rate after heat-aging resistance test Tensile breaking elongation (%) | Crack resistance |
|---|---|---|---|---|---|---|---|---|---|---|---|
| Comparative Example 10 | Polymer species | Comparative Example 4 | Comparative Example 5 | (c)-1 | 2400 | 1860 | 0.78 | 0.70 | 8 | 20 | X |
|  | Blending ratio (% by mass) | 6 | 4 | 90 |  |  |  |  |  |  |  |
| Comparative Example 11 | Polymer species | Comparative Example 4 | Comparative Example 5 | (c)-1 | 2260 | 1770 | 0.78 | 0.71 | 11 | 24 | X |
|  | Blending ratio (% by mass) | 8 | 8 | 84 |  |  |  |  |  |  |  |
| Comparative Example 12 | Polymer species | Comparative Example 4 | Comparative Example 6 | (c)-1 | 2300 | 1790 | 0.78 | 0.70 | 13 | 28 | X |
|  | Blending ratio (% by mass) | 8 | 8 | 84 |  |  |  |  |  |  |  |
| Comparative Example 13 | Polymer species | — | Comparative Example 5 | (c)-1 | 2220 | 1700 | 0.77 | 0.72 | 10 | 23 | X |
|  | Blending ratio (% by mass) |  | 8 | 92 |  |  |  |  |  |  |  |
| Comparative Example 14 | Polymer species | — | Comparative Example 6 | (c)-1 | 2280 | 1710 | 0.75 | 0.71 | 13 | 26 | X |
|  | Blending ratio (% by mass) |  | 8 | 92 |  |  |  |  |  |  |  |

The components blended and blending ratio were completely identical and whether a block copolymer composition prepared by blending a polymer (a) and a block copolymer (b) in advance was used or pellets of a polymer (a) and pellets of a block copolymer (b) each individually finished were used was different between Example 21 and Comparative Example 10, between Example 22 and Comparative Example 11, and between Example 29 and Comparative Example 12.

It was found that blending of a block copolymer composition, as a modifier, prepared by blending a polymer (a) and a block copolymer (b) in advance provided an isotropic sheet with a TD/MD ratio close to 1 and less anisotropy, and the change rates after the heat-aging resistance test of the sheet were small, and the result of the crack resistance test for the sheet was also satisfactory.

In Comparative Examples 7 and 8, in contrast, it was found that the amount of the vinyl aromatic monomer unit bonding in a polymer (a) was out of the range specified in the present invention, and as a result large degradation of physical properties was found after the heat-aging resistance test, although impact strength was exerted, and in addition the crack resistance was poor.

In Comparative Example 9, the sheet formability was poor as flow marks were generated over the whole surface of the sheet, and a good sheet was not obtained. For this reason, Comparative Example 9 was not evaluated.

Examples 33 to 39, Comparative Examples 15 to 22

A vinyl aromatic-based polymer (d) was further added, and the physical properties were investigated.

Each of the molded materials comprising various block copolymer compositions listed in the above [Table 3] was combined with the rubber-modified vinyl aromatic polymer (c) and a vinyl aromatic-based polymer (d), and pellets of them were dry-blended at a blending ratio listed in [Table 6] below, for which sheet molding through T-die extrusion was performed to prepare a sheet having a thickness of 0.4 mm.

In Comparative Examples 18 to 22, a molded material comprising a polymer (a) and a block copolymer (b) each as an independent polymer (i.e., without use of a block copolymer composition comprising a polymer (a) and a block copolymer (b)) was similarly combined with the rubber-modified vinyl aromatic polymer (c) and a vinyl aromatic-based polymer (d), and pellets of them were dry-blended at a blending ratio listed in [Table 7] below, for which sheet molding through T-die extrusion was performed to obtain a sheet having a thickness of 0.4 mm and a sheet having a thickness of 1.0 mm.

The sheets obtained were used for the above-described evaluations. A container was formed from the sheet having a thickness of 1.0 mm through vacuum forming, and the crack resistance was evaluated.

The blending compositions and evaluation results are listed in the following [Table 6] and [Table 7].

TABLE 6

| | | Block copolymer composition | Rubber-modified vinyl aromatic polymer (c) | Vinyl aromatic-based polymer (d) | Tensile modulus MD (MPa) | Tensile modulus TD (MPa) | Isotropy (TD/MD) | Impact strength Dart impact value (J) | Crack resistance |
|---|---|---|---|---|---|---|---|---|---|
| Example 33 | Polymer species | Example 3 | (c)-1 | (d)-1 | 2090 | 1780 | 0.85 | 0.88 | ○ |
| | Blending ratio (% by mass) | 30 | 20 | 50 | | | | | |
| Example 34 | Polymer species | Example 3 | (c)-1 | (d)-1 | 2720 | 2530 | 0.93 | 0.75 | ⊚ |
| | Blending ratio (% by mass) | 15 | 20 | 65 | | | | | |
| Example 35 | Polymer species | Example 4 | (c)-1 | (d)-1 | 2760 | 2640 | 0.96 | 0.87 | ⊚ |
| | Blending ratio (% by mass) | 12 | 20 | 68 | | | | | |
| Example 36 | Polymer species | Example 4 | (c)-1 | (d)-1 | 2560 | 2502 | 0.98 | 0.94 | ⊚ |
| | Blending ratio (% by mass) | 12 | 30 | 58 | | | | | |
| Example 37 | Polymer species | Example 10 | (c)-1 | (d)-1 | 2200 | 1680 | 0.76 | 0.78 | ○ |
| | Blending ratio (% by mass) | 20 | 20 | 60 | | | | | |
| Example 38 | Polymer species | Example 3 | (c)-1 | (d)-1 | 2000 | 1580 | 0.79 | 0.76 | ○ |
| | Blending ratio (% by mass) | 45 | 20 | 35 | | | | | |
| Example 39 | Polymer species | Example 12 | (c)-1 | (d)-1 | 2053 | 1932 | 0.94 | 0.77 | ⊚ |
| | Blending ratio (% by mass) | 25 | 20 | 55 | | | | | |
| Comparative Example 15 | Polymer species | Comparative Example 1 | (c)-1 | (d)-1 | 2650 | 1800 | 0.68 | 0.68 | X |
| | Blending ratio (% by mass) | 15 | 20 | 65 | | | | | |
| Comparative Example 16 | Polymer species | Comparative Example 2 | (c)-1 | (d)-1 | 2580 | 1710 | 0.66 | 0.73 | X |
| | Blending ratio (% by mass) | 15 | 20 | 65 | | | | | |
| Comparative Example 17 | Polymer species | Comparative Example 3 | (c)-1 | (d)-1 | — | — | — | — | — |
| | Blending ratio (% by mass) | 15 | 20 | 65 | | | | | |

TABLE 7

| | | Polymer (a) | Block copolymer (b) | Rubber-modified vinyl aromatic polymer (c) | Vinyl aromatic-based polymer (d) | Tensile modulus MD (MPa) | Tensile modulus TD (MPa) | Isotropy (TD/MD) | Impact strength Dart impact value (J) | Crack resistance |
|---|---|---|---|---|---|---|---|---|---|---|
| Comparative Example 18 | Polymer species | Comparative Example 4 | Comparative Example 5 | (c)-1 | (d)-1 | 2080 | 1290 | 0.62 | 0.54 | X |
| | Blending ratio (% by mass) | 18 | 12 | 20 | 50 | | | | | |
| Comparative Example 19 | Polymer species | Comparative Example 4 | Comparative Example 5 | (c)-1 | (d)-1 | 2690 | 2160 | 0.80 | 0.39 | X |
| | Blending ratio (% by mass) | 9 | 6 | 20 | 65 | | | | | |

TABLE 7-continued

| | | Polymer (a) | Block copolymer (b) | Rubber-modified vinyl aromatic polymer (c) | Vinyl aromatic-based polymer (d) | Tensile modulus MD (MPa) | Tensile modulus TD (MPa) | Isotropy (TD/MD) | Impact strength Dart impact value (J) | Crack resistance |
|---|---|---|---|---|---|---|---|---|---|---|
| Comparative Example 20 | Polymer species | Comparative Example 4 | Comparative Example 6 | (c)-1 | (d)-1 | 1990 | 1570 | 0.79 | 0.57 | X |
| | Blending ratio (% by mass) | 15 | 10 | 20 | 55 | | | | | |
| Comparative Example 21 | Polymer species | — | Comparative Example 5 | (c)-1 | (d)-1 | 2140 | 1300 | 0.61 | 0.51 | X |
| | Blending ratio (% by mass) | | 12 | 20 | 68 | | | | | |
| Comparative Example 22 | Polymer species | — | Comparative Example 6 | (c)-1 | (d)-1 | 2040 | 1590 | 0.78 | 0.49 | X |
| | Blending ratio (% by mass) | | 10 | 20 | 70 | | | | | |

The components blended and blending ratio were completely identical and whether a block copolymer composition prepared by blending a polymer (a) and a block copolymer (b) in advance was used or pellets of a polymer (a) and pellets of a block copolymer (b) each individually finished were used was different between Example 33 and Comparative Example 18, between Example 34 and Comparative Example 19, and between Example 39 and Comparative Example 20.

It was demonstrated that blending of a block copolymer composition, as a modifier, prepared by blending a polymer (a) and a block copolymer (b) in advance provided a satisfactory isotropic sheet with higher impact strength and a TD/MD ratio close to 1 and less anisotropy, and the results of both of the impact resistance test and the crack resistance test were satisfactory.

In Comparative Example 17, the sheet formability was poor as flow marks were generated over the whole surface of the sheet, and a good sheet was not obtained. For this reason, Comparative Example 17 could not be evaluated properly.

Example 40, Comparative Example 23

The material obtained by grounding wastes in sheet fragments generated in processing a GPPS starting material into OPS sheets (vinyl aromatic-based polymer (d)-2) was used to prepare a sheet having a thickness of 0.4 mm and a sheet having a thickness of 1.0 mm, and evaluation was performed in the same manner.

The evaluation results are listed in the following [Table 8].

TABLE 8

| | | Block copolymer composition or independent polymers | | Rubber-modified vinyl aromatic polymer (c) | Recovered OPS material | Tensile modulus MD (MPa) | Tensile modulus TD (MPa) | Isotropy (TD/MD) | Impact strength Dart impact value (J) | Crack resistance |
|---|---|---|---|---|---|---|---|---|---|---|
| Example 40 | Polymer species | Example 4 | | (c)-1 | (d)-2 | 2490 | 2330 | 0.94 | 0.72 | ◎ |
| | Blending ratio (% by mass) | 22 | | 20 | 58 | | | | | |
| Comparative Example 23 | Polymer species | Comparative Example 4 | Comparative Example 5 | (c)-1 | (d)-2 | 2380 | 2020 | 0.85 | 0.35 | X |
| | Blending ratio (% by mass) | 11 | 11 | 20 | 58 | | | | | |
| Reference Example | Polymer species | | | (c)-1 | | 2400 | 2410 | 1.00 | 0.68 | ◎ |
| | Blending ratio (% by mass) | | | 100 | | | | | | |

The resin composition in Example 40, for which the block copolymer composition in Example 4 was used, exhibited mechanical characteristics similar to those of the PSJ-Polystyrene 475D alone, which was used in Examples as the component (c), in a single configuration.

In contrast, the sheet in Comparative Example 23, which was prepared by using a polymer (a) and a block copolymer (b) each in pellets without preliminary blending, was found to be poor in impact resistance and have large anisotropy.

The present application is based on a Japanese patent application (Japanese Patent Application No. 2015-023417) filed in the Japan Patent Office on 9 Feb. 2015 and a Japanese patent application (Japanese Patent Application No. 2015-023199) filed in the Japan Patent Office on 9 Feb. 2015, the contents of which are incorporated by reference herein.

INDUSTRIAL APPLICABILITY

The block copolymer composition according to the present invention has industrial applicability as a material for a wide variety of packaging containers for drinks, food, electronics parts, etc.

The invention claimed is:

1. A block copolymer composition comprising:
   a polymer (a) comprising more than 95% by mass and less than 100% by mass of a vinyl aromatic monomer unit and more than 0% by mass and less than 5% by mass of a conjugated diene monomer unit; and
   a block copolymer (b) comprising 15% by mass and 50% by mass or less of a vinyl aromatic monomer unit and 50% by mass or more and 85% by mass or less of a conjugated diene monomer unit, wherein the conjugated diene monomer unit excludes isoprene,
   wherein a mass ratio of the polymer (a) to the block copolymer (b) satisfies:

$(a)/(b)$=70/30 to 30/70.

2. The block copolymer composition according to claim 1, wherein a total content of a dimer and trimer each comprising a vinyl aromatic monomer is less than 1000 ppm.

3. The block copolymer composition according to claim 1, wherein a haze value for 2 mm thickness defined in ISO 14782 is 65% or more and 100% or less.

4. The block copolymer composition according to claim 1, wherein the block copolymer composition has at least one peak molecular weight in a range of 30000 or more and 180000 or less in a molecular weight distribution curve obtained through a GPC method.

5. The block copolymer composition according to claim 1, wherein the block copolymer composition has at least one tan δ peak of dynamic viscoelasticity at a temperature in a range of −70° C. to −40° C.

6. A molded material comprising the block copolymer composition according to claim 1.

7. A resin composition comprising:
   80% by mass or more and 99% by mass or less of a rubber-modified vinyl aromatic polymer (c); and
   1% by mass or more and 20% by mass or less of the block copolymer composition of claim 1.

8. A resin composition comprising:
   more than 0% by mass and 80% by mass or less of a vinyl aromatic-based polymer (d);
   10% by mass or more and 45% by mass or less of a rubber-modified vinyl aromatic polymer (c); and
   10% by mass or more and 55% by mass or less of the block copolymer composition of claim 1.

9. A molded product comprising the resin composition according to claim 7.

10. A molded product comprising the resin composition according to claim 8.

11. The block copolymer composition according to claim 1, wherein a mass ratio of the polymer (a) to the block copolymer (b) satisfies:

$(a)/(b)$=55/45 to 45/55.

12. The block copolymer composition according to claim 1, wherein the vinyl aromatic monomer unit is selected from the group consisting of styrene, o-methylstyrene, m-methylstyrene, p-methylstyrene, o-ethylstyrene, p-ethylstyrene, p-tert-butylstyrene, 2,4-dimethylstyrene, 1,3-dimethylstyrene, α-methylstyrene, α-methyl-p-methylstyrene, vinylnaphthalene, vinylanthracene, and 1,1-diphenylethylene.

13. The block copolymer composition according to claim 1, wherein the vinyl aromatic monomer unit comprises styrene.

14. The block copolymer composition according to claim 1, wherein the conjugated diene monomer unit is selected from the group consisting of 1,3-butadiene, 2-methyl-1,3-butadiene, 2,3-dimethyl-1,3-butadiene, 1,3-pentadiene, and 1,3-hexadiene.

15. The block copolymer composition according to claim 1, wherein the conjugated diene monomer unit comprises 1,3-butadiene and/or 2-methyl-1,3-butadiene.

* * * * *